US010074239B2

(12) United States Patent
Arnone et al.

(10) Patent No.: US 10,074,239 B2
(45) Date of Patent: Sep. 11, 2018

(54) INTEGRATED GAMBLING PROCESS FOR GAMES WITH EXPLICIT RANDOM EVENTS

(71) Applicant: Gamblit Gaming, LLC, Glendale, CA (US)

(72) Inventors: Miles Arnone, Sherborn, MA (US); David Chang, San Gabriel, CA (US); Frank Cire, Pasadena, CA (US); Eric Meyerhofer, Pasadena, CA (US)

(73) Assignee: Gamblit Gaming, LLC, Glendale, CA (US)

(*) Notice: Subject to any disclaimer, the term of this patent is extended or adjusted under 35 U.S.C. 154(b) by 268 days.

(21) Appl. No.: 14/955,000

(22) Filed: Nov. 30, 2015

(65) Prior Publication Data

US 2016/0163150 A1 Jun. 9, 2016

Related U.S. Application Data

(63) Continuation of application No. PCT/US2014/035832, filed on Apr. 29, 2014.
(Continued)

(51) Int. Cl.
*G06F 17/00* (2006.01)
*G07F 17/32* (2006.01)

(52) U.S. Cl.
CPC ...... *G07F 17/3244* (2013.01); *G07F 17/3223* (2013.01); *G07F 17/3234* (2013.01); *G07F 17/3237* (2013.01); *G07F 17/3246* (2013.01); *G07F 17/3251* (2013.01); *G07F 17/3286* (2013.01)

(58) Field of Classification Search
None
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

WO 2013033048 A1 3/2013
WO 2013059308 A2 4/2013
WO 2014179284 A1 11/2014

OTHER PUBLICATIONS

U.S. Appl. No. 14/185,847 Arnone, et al., filed Feb. 20, 2014.
(Continued)

*Primary Examiner* — Ronald Laneau
(74) *Attorney, Agent, or Firm* — Caitlyn Ross

(57) ABSTRACT

A gambling hybrid game with a gambling integrated game is disclosed. The gambling hybrid game includes an entertainment system engine that provides an entertainment game to a user, a real world engine that provides gambling games to one or more users, and a game world engine that monitors the entertainment game and provides gambling games when appropriate. The entertainment system engine provides an entertainment game that includes random events. When a random event occurs in the entertainment game, the game world engine resolves the random event using random outcomes from the real world engine and provides the results of the random event to the entertainment software engine. The random outcomes are also used to resolve a gambling event corresponding to the random event.

8 Claims, 28 Drawing Sheets

Related U.S. Application Data

(60) Provisional application No. 61/829,162, filed on May 30, 2013, provisional application No. 61/817,807, filed on Apr. 30, 2013.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,430,735 | B2 | 4/2013 | Oberberger |
| 8,475,266 | B2 | 7/2013 | Arnone |
| 8,480,470 | B2 | 7/2013 | Napolitano et al. |
| 8,622,809 | B1 | 1/2014 | Arora et al. |
| 8,864,564 | B2 | 10/2014 | Oberberger |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0204222 | A1 | 10/2004 | Roberts |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |

(56) References Cited

U.S. PATENT DOCUMENTS

2009/0061974 A1 3/2009 Lutnick et al.
2009/0061975 A1 3/2009 Ditchev
2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1* 5/2012 Kelly .................. G07F 17/3239
463/26
2012/0135793 A1 5/2012 Antonopoulos
2012/0202587 A1 8/2012 Allen
2012/0302311 A1 11/2012 Luciano
2012/0322545 A1* 12/2012 Arnone ............... G07F 17/3272
463/25
2013/0029760 A1 1/2013 Wickett
2013/0131848 A1 5/2013 Arnone et al.
2013/0190074 A1 7/2013 Arnone et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0357350 A1 12/2014 Weingardt et al.
2016/0019750 A1 1/2016 Arnone et al.
2016/0163150 A1* 6/2016 Arnone ............... G07F 17/3223
463/22
2017/0243441 A1* 8/2017 Arnone ............... G07F 17/3246

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.

(56) References Cited

OTHER PUBLICATIONS

U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
Final Office Action dated Feb. 8, 2017; U.S. Appl. No. 14/904,947.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/949,759 Arnone, et al. filed Nov. 23, 2015.
International Search Report and Written Opinion, PCT/US2014/035832, dated Aug. 28, 2014.
IP Australia, Patent Examination Report No. 1, Patent Application No. 2014260147, dated Jul. 19, 2017.

* cited by examiner

INTEGRATED GAMBLING PROCESS FOR GAMES WITH EXPLICIT RANDOM EVENTS

CROSS-REFERENCE TO RELATED APPLICATIONS

The current application is a continuation of Patent Cooperation Treaty Application No. PCT/US14/35832, filed Apr. 29, 2014, which claims the benefit of U.S. Provisional Application Nos. 61/817,807, filed Apr. 30, 2013, and 61/829,162 filed May 30, 2013, the disclosures of each of which are incorporated herein by reference as if set forth herewith. This application references Patent Cooperation Treaty Application Nos. PCT/US12/58156, filed Sep. 29, 2012, PCT/US11/26768, filed Mar. 1, 2011, PCT/US11/63587, filed Dec. 6, 2011, and PCT/US12/50204 filed Aug. 9, 2012, the disclosure of each of which is incorporated herein by reference as if set forth herewith.

FIELD OF THE INVENTION

Embodiments of the present disclosure are generally related to gaming and more specifically to systems and processes that enhance a gambling process in a gambling game based upon random events that occur in an entertainment game.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game.

SUMMARY

The disclosed embodiments relate generally to an interactive entertainment game where skill and chance may coalesce to provide a rich arcade-style gaming experience, visually exciting and challenging, where players may wager cash, credits prizes and points in order to win more of the foregoing. Many of the embodiments of the design provide an enticing method of gaming to the players who expect a high level of entertainment content in their gaming experience compared to the relatively simple game methods in use today.

In accordance with embodiments of this invention, a casino electronic game machine providing a gambling hybrid game that includes an entertainment game and a gambling game, including a real world engine including a real world credit meter, a random number generator, and a real world credit pay table, where the real world engine is configured to: receive real world credit from a portable media, where the portable media includes at least one member of a group including currency, a voucher and a smart card, and provide a randomly generated payout of real world credits from a wager of real world credits in the gambling game using the random number generator and real world credit pay table, augment an amount of real world credits stored in the real world credit meter based on the randomly generated payout of real world credits to the real world credit meter; an entertainment system engine constructed to execute the entertainment game to resolve a random event in the entertainment game to generate random event results, and provide the random event results to a game world engine; a display screen configured to display the random event results of the wagers; a user input device configured to receive from a player a wagering amount to use during game play; and the game world engine constructed to determine an occurrence of a gambling event in the gambling game based on play of the entertainment game executed by the entertainment system engine, request a resolution to the gambling event by the real world engine, determine gambling results based upon the random event results, and provide the gambling results to the entertainment system engine for use in executing the entertainment game.

In accordance with numerous embodiments, the real world engine is further configured to receive, from the game world engine, the random event results, determine the gambling results from random event results, and provide, to the game world engine, the gambling results.

In accordance with many embodiments, entertainment system engine is further constructed to detect the random event is to occur during execution of the entertainment game, request, from the game world engine, gambling information for the random event, receive, from the game world engine, the gambling information for the random event, and provide the gambling information to the player during execution of the entertainment game.

In accordance with various embodiments, the game world engine is further constructed to generate the gambling information for the random event.

In accordance with numerous embodiments, the game world engine is further constructed to request, from the real world engine, the gambling information for the random event, and receive, from the real world engine, the gambling information for the random event.

In accordance with many embodiments, the real world engine is further constructed to determine the gambling information for the random event, and provide, to the game world engine, the gambling information for the random event.

In accordance with various embodiments, the game world engine is further constructed to receive player information from a player management system and use the random event results and the player information to determine the gambling results for the random event.

In accordance with numerous embodiments, the game world engine is further constructed to receive game provider information from a game provider system, and use the random event results and the game provider information to determine the gambling results for the random event.

DETAILED DESCRIPTION

Figure 1:
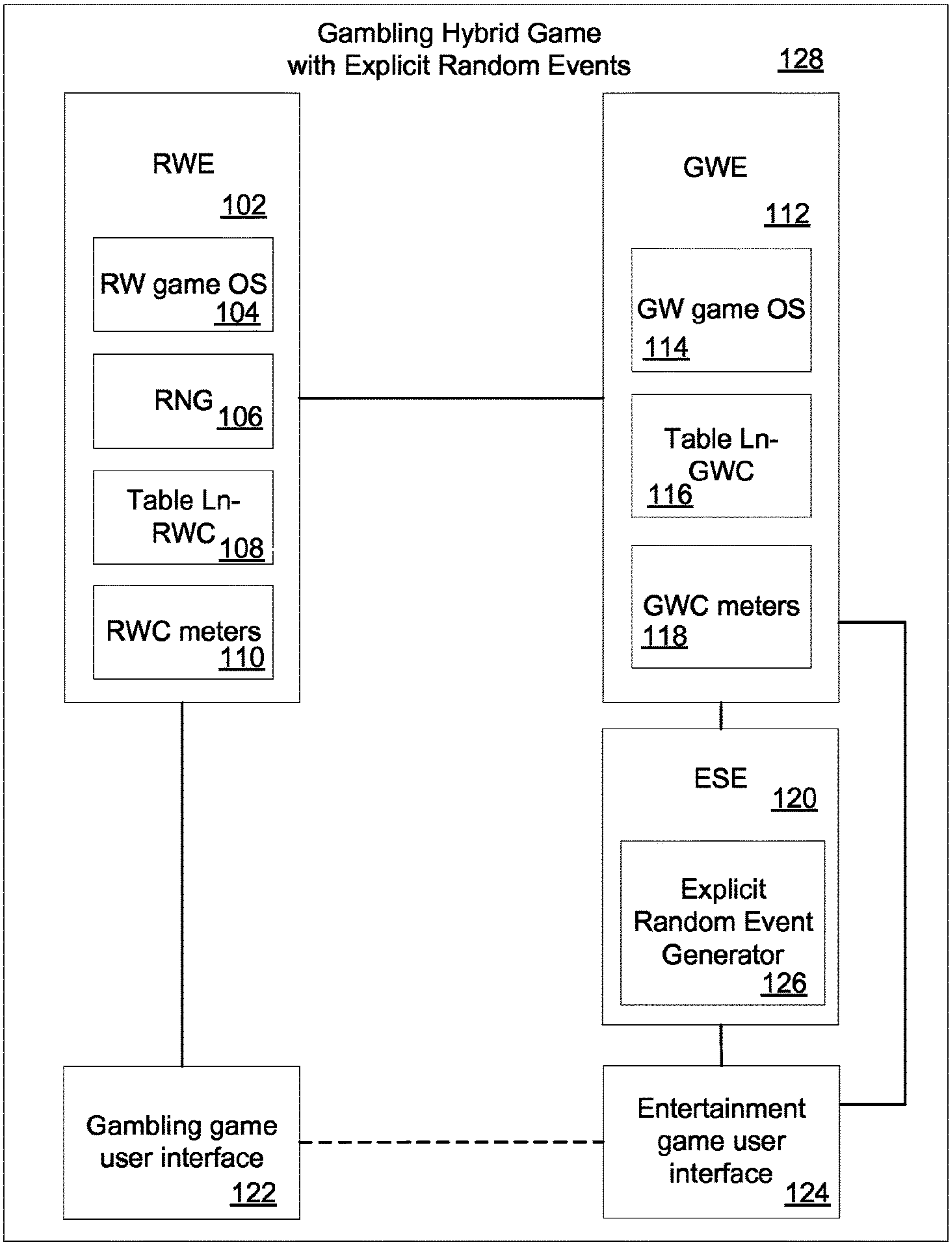
FIG. 1 illustrates a conceptual diagram of components of a gambling hybrid game in accordance with an embodiment of the invention.

Turning now to the drawings, systems and methods for providing a gambling hybrid game with a gambling integrated game are illustrated. A gambling integrated game is a game in which results from a random event in an interactive skill-based entertainment game are used to determine the results of events in a gambling game. Examples of random events in an entertainment game include, but are not limited to, the drawing of cards, die rolls, the selection of a game piece from a pool of pieces, and a spin of a wheel. In accordance with some embodiments of the invention, the results of the random event in the entertainment game may determine payouts of wagers in a gambling game. In accordance with many embodiments of the invention, the random event in the entertainment game may be a gambling event in a gambling game and the results of the random event in the entertainment game may be used to determine payouts to a player in terms of real world credits, in-game objects of the entertainment game, alteration of in-game variables of the entertainment game and/or allocation of credits to one or more pools being collected by the game operator. Systems and methods for providing a gambling hybrid game with a gambling integrated game in accordance with embodiments of this invention are described below with reference to the provided drawings.

Gambling Hybrid Games

In accordance with many embodiments of this invention, a gambling hybrid game integrates high-levels of entertainment content with a game of skill (an entertainment game) and a gambling experience with a game of chance (a gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such system or device that provides a pseudo random or random outcome in response to a request. In accordance with some embodiments, the wager game may be initiated in response to a game object related player action. A gambling hybrid game in accordance with an embodiment of the invention is illustrated in FIG. 1. The gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE 102 includes a Real World (RW) operating system (OS) 104, RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

RNG 106 includes software and/or hardware algorithms and/or processes, which are used to generate pseudo random or random outcomes. A level n real-world credit pay table (Table Ln-RC) 108 is a table that can be used in conjunction with RNG 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of an RNG according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game, level n, need not be the same for each level.

In accordance with some embodiments of this invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and his or her activities in the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to an RNG. In accordance with some embodiments, GWCs are player points earned or depleted as a function of player skill, specifically as a function of player performance in the context of the entertainment game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In some embodiments, the RWE provides random outcomes on the basis of a pari-mutuel wagering system, such as those used for sporting events, horseraces, and the like.

In various embodiments, the RWE can be used to provide random outcomes in response to a request for resolving a random event within an entertainment game of the GIG. In other embodiments, an RNG is provided within a GWE of the GIG for resolving the random events in the entertainment game.

In accordance with various embodiments of this invention, the ESE 120 manages and controls the visual, audio, and player control for an entertainment game including random events whose outcomes provide options to the player, determine the outcome of some actions or moves taken by the player, or otherwise influence the player's play of the entertainment game. In many embodiments, the entertainment game is an interactive skill-based entertainment game where a player exercises their skill in the game by reacting to or otherwise taking into account random outcomes for random events that occur within the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's function in this architecture, being interfaced with the ESE 120, which include an explicit random events generator 126, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 112 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

In accordance with some embodiments, the use of the RWE, GWE and ESE allows for the separation of control of a gambling hybrid game between different devices. For example, the ESE may be hosted by a device that is separate from any devices that host the RWE and/or GWE. Through separation of control of the functions of the ESE, RWE and GWE, the RWE may be isolated from the player's device, thus preventing player interference with the RWE and the gambling game. In addition, as the ESE is responsible for providing the entertainment game, gambling hybrid games may provide for complex entertainment games for the player as the ESE need not include the tightly regulated components of the RWE, thus providing for more freedom in ESE design. Also, separation of control allows a GWE to provide complex wager initiation rules that would not be possible if the either the ESE or the RWE were to be in control of the wager initiation.

In accordance with various embodiments, a gambling hybrid game allows for interleaving of continuous wagering within an entertainment game. For example, instead of wagering once, and then playing an entertainment game to completion, or playing an entertainment game to completion and then placing a wager, a gambling hybrid game allows a gaming system or device to be provided to a player where the gaming system or device provides a complex and interesting entertainment game with wagering incorporated throughout the entertainment game.

In various embodiments, a gambling hybrid game provides for feedback into the entertainment game of additional entertainment game resources that are made available in the ESE for the use of the player as the result of wagering outcomes. The additional entertainment game resources may enable portions of the entertainment game that were not available to the player without the resources.

In many embodiments, a gambling hybrid game provides the ability to use the gambling hybrid game in more than one jurisdiction, as the ESE is a component separate from the GWE and RWE. For example, the ESE may be operated as either a pure entertainment game, or as a gambling game depending on the type of characteristics of the RWE that the ESE is coupled to.

In some embodiments, a gambling hybrid game provides for display of an entertainment game on a player's device that the player is using to interact with the entertainment game, as well as providing a separate display of a state of a gambling game on a separate gambling game display. The separate gambling game display may be on the player's device within the same physical display device, on a separate device having a separate physical screen, or on a separate physical display device on the player's device.

Figure 2:
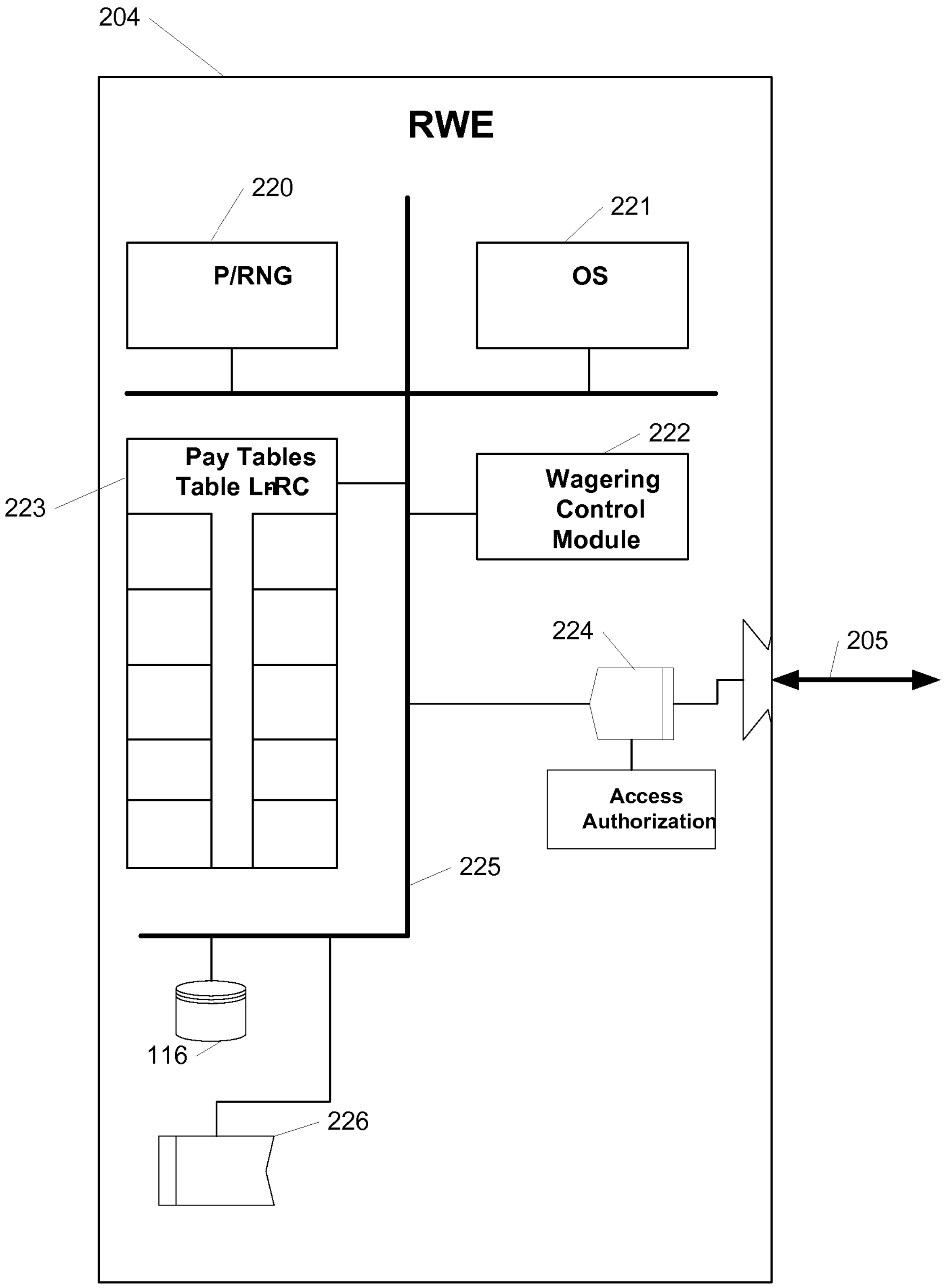
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Pseudo Random or Random Number Generator (P/RNG) 220, one or more pay tables (Table Ln-RC) 223, a wagering control module 222, an authorization access module 224, and a RC credit meter 226 that are included in the RWE 204. The RW OS 221 controls the functions of the RWE 204. The P/RNG 220 includes one or more RNGs that are used to produce random numbers for use in resolving gambling events and other process requiring a random number to determine an outcome. The one or more pay tables (Table Ln-RC) 223 control the functions of the RWE and contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 226 maintains a record of the amount of RC which a player has deposited in the game and has been accumulated by the player.

An external connection allows the RWE 204 to interface to another system or device, which is shown in FIG. 2 as the Internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
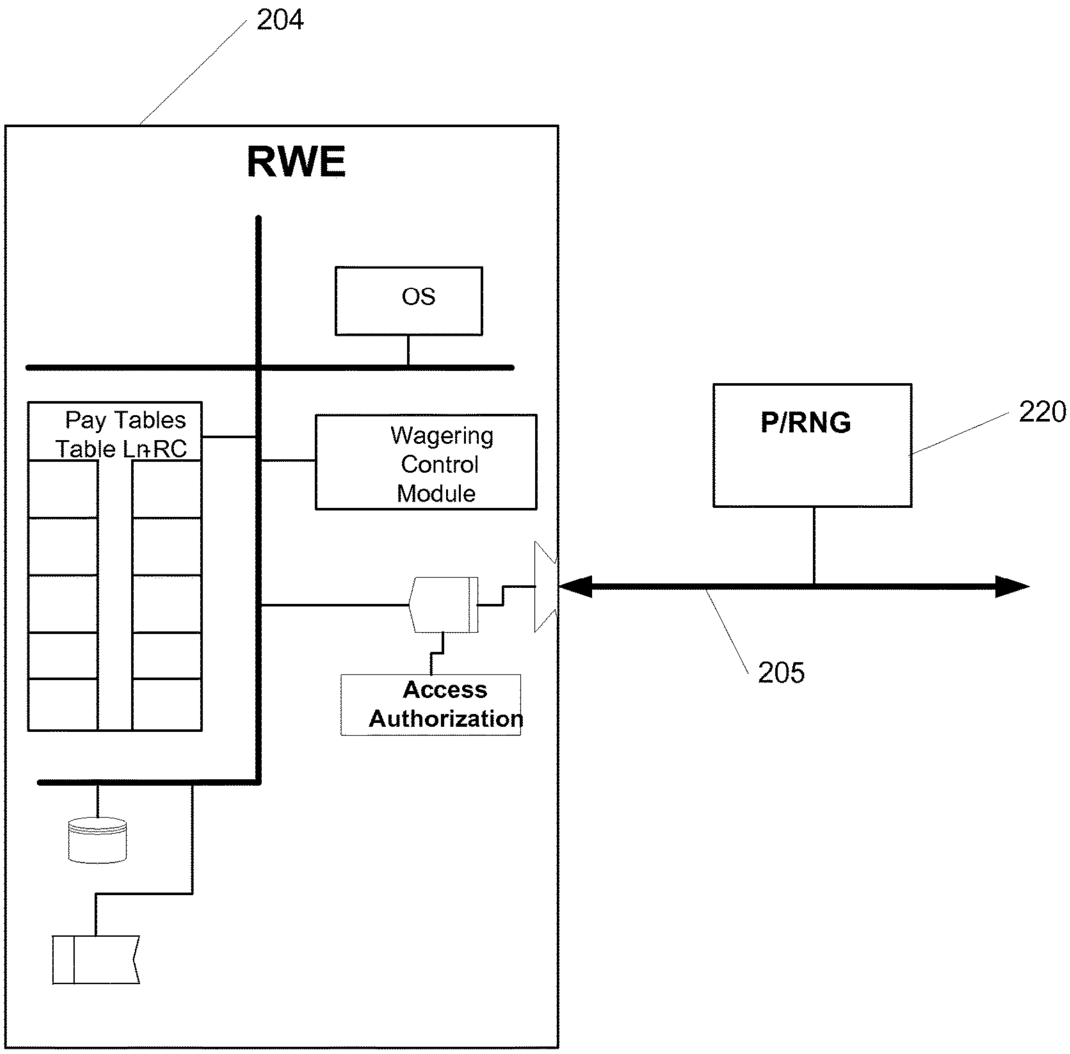
FIG. 3 illustrates a conceptual diagram of aspects of a Real World Engine (RWE) of a gambling hybrid game in accordance with some other embodiments of the invention.

In some embodiments, the RWE 204 communicates with external systems to provide various functions of a gambling hybrid game in accordance with embodiments of the invention. The components of an RWE 204 that communicate with an external system to provide a component of the RWE 204 in accordance with embodiments of the invention are shown in FIG. 3. The RWE 204 shown in FIG. 3 is similar to the RWE shown in FIG. 2. However, the P/RNG 220 is an external system connected to the RWE 204 by the Internet 205 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the embodiment illustrated in FIG. 3. However, any of the components could be external systems without departing from the invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the Internet 205 in other embodiments of the invention. Other examples of interfaces include, but are not limited to, a LAN, a USB interface, or some other method by which two electronic and software constructs could communicate with each other.

Figure 4:
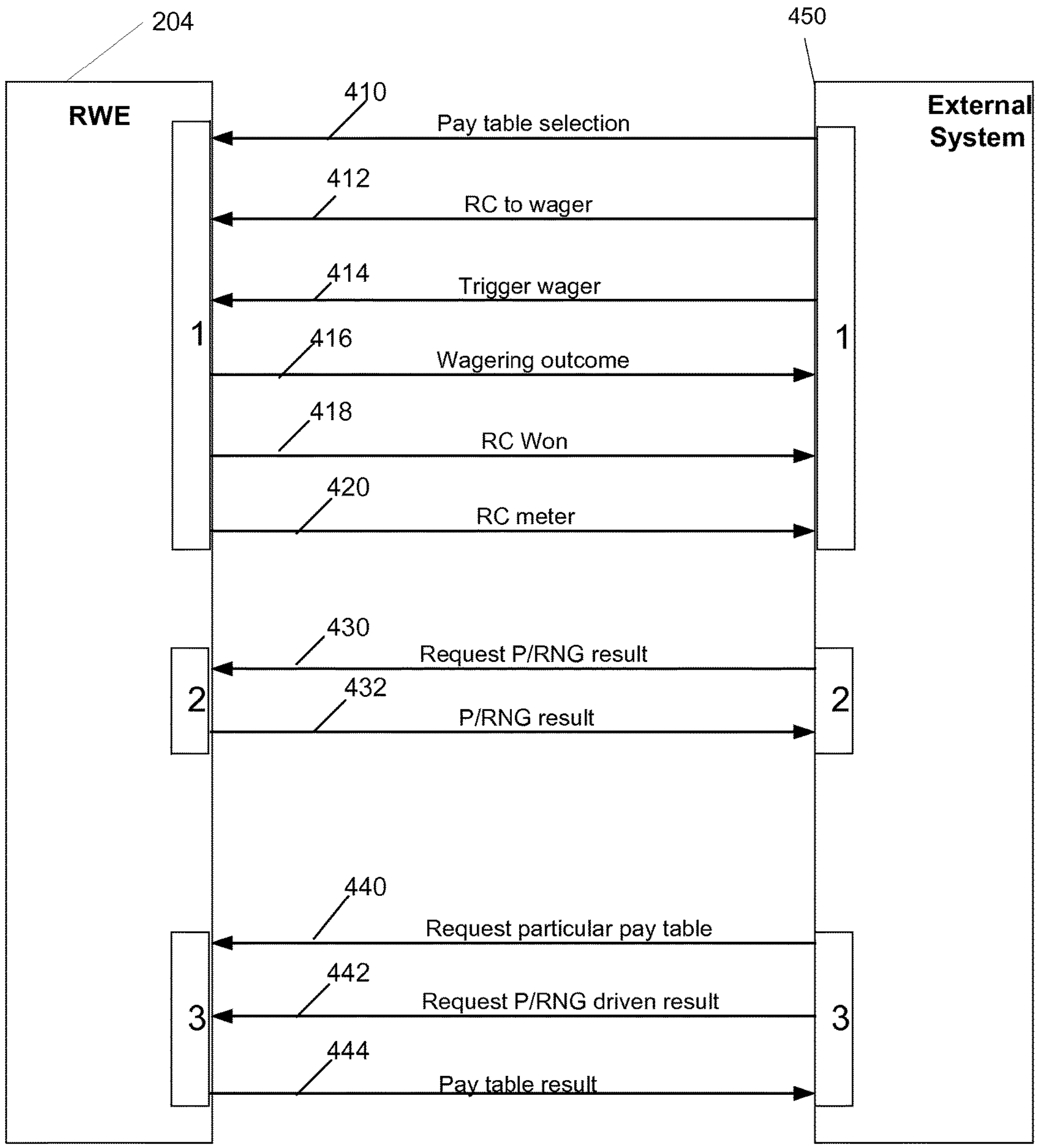
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with many embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 404 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an P/RNG result support from the RWE 204. In this exchange, the external system 450 requests an P/RNG result from the RWE 204 (430). The RWE 204 returns a P/RNG result to the external system 450 in response to the request (432). The result may be generated as a function of the internal P/RNG in the RWE 204, or from a P/RNG external to the RWE 204 to which the RWE 204 is connected.

A third communication exchange between the RWE 204 and the external system 450 in accordance with embodiments of the invention that is shown in FIG. 4 is grouped by the "3" box in the figure and relates to the external system 450 wanting support on coupling an P/RNG result to a particular Pay Table contained in the RWE 204. In this exchange, the external system 450 instructs the RWE as to the pay table (Table Ln-RC) to use (440). The external system (450) then requests a result whereby the P/RNG result is coupled to the requested Pay Table (442). The result is returned to the external system 450 by RWE 204 (444). Such an aspect is different from the first exchange shown by the box "1" sequence in that no actual RC wager is conducted. However, such a process, t, might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
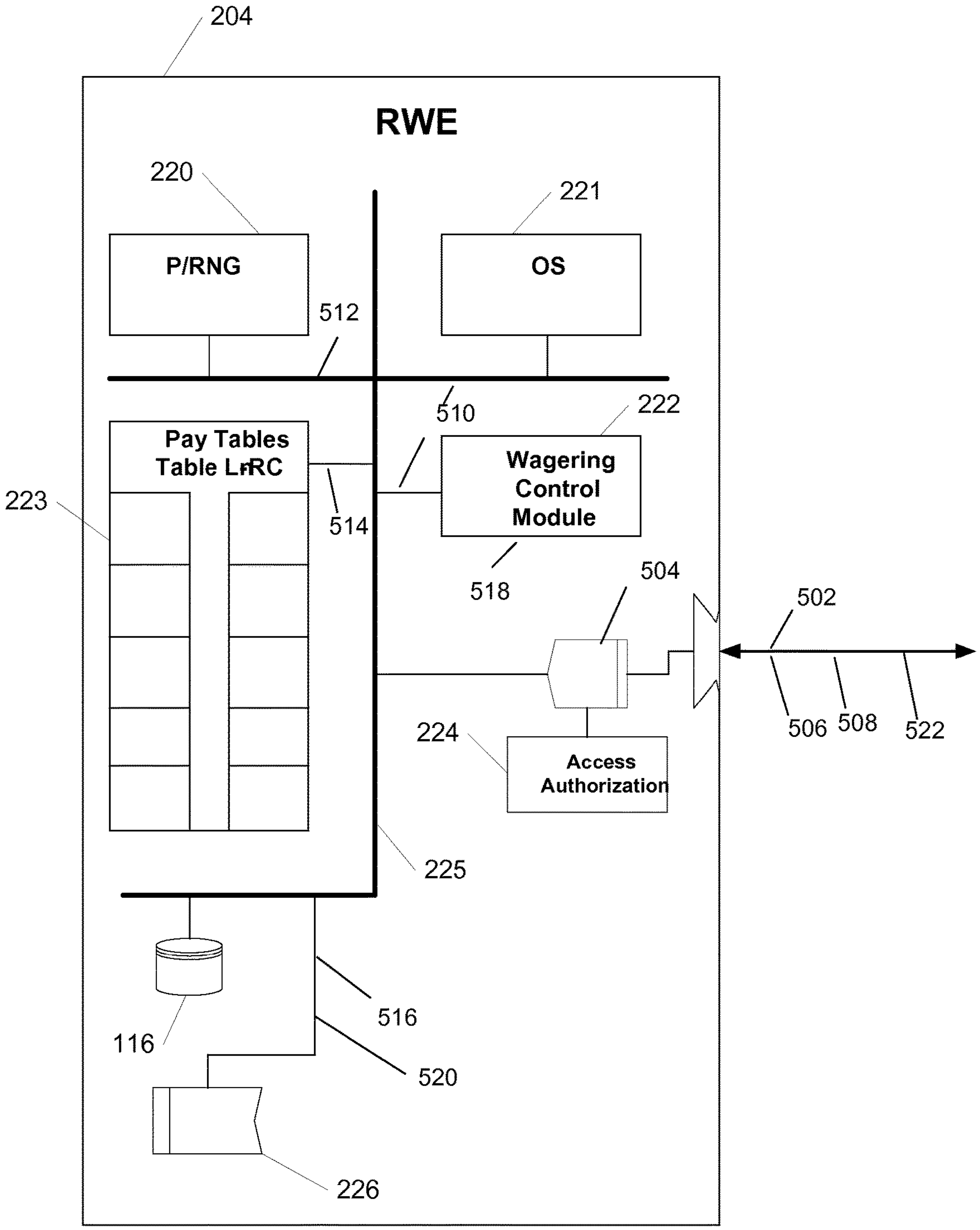
FIG. 5 illustrates a diagram of a process flow and signaling in a Real World Engine (RWE) to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204 (502). The Access Authorization Module determines that the external system is authorized to connect to RWE 204 (504) and transmits an authorization response to the external system. The external systems provide a request for a gambling event to be performed to the RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execution (510). In response to the request to execute the gambling event, the wager control module 222 requests an P/RNG result from the P/RNG 220 (512); retrieves a proper pay table or tables from the pay tables 223 (514); adjusts the RC of the player in the RC repository 226 as instructed (516); applies the P/RNG result to the particular pay table or tables (518); and multiplies the resultant factor from the Pay Table by the amount of RC to determine the result of the wager (518). Wager Control Module 222 then adds the amount of RC won by the wager to the RC repository 226 (520); and provides he outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 an accordance with some embodiments of the invention.

Figure 6:
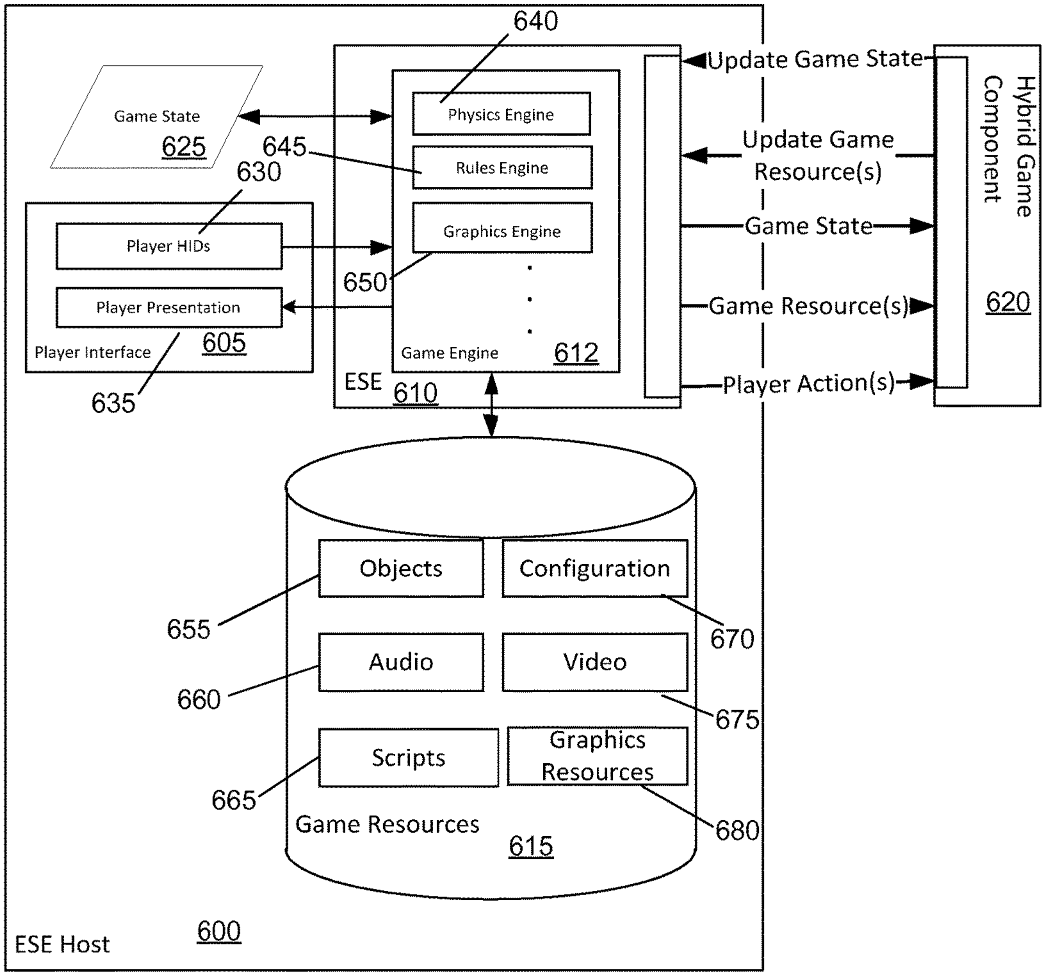
FIG. 6 illustrates a conceptual diagram of aspects of an Entertainment System Engine (ESE) in accordance with embodiments of the invention.

A block diagram of components of an ESE being provided by an ESE host 600 for a gambling hybrid game in accordance with embodiments of the invention is shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an P/RNG that may be used for influencing or determining certain variables and/or outcomes to provide a randomizing influence on gameplay, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various gameplay features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process can loop in a game loop continuously while the player plays the game.

In some embodiments, the ESE 610 is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE 610 is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, now U.S. Pat. No. 8,632,395 issued Jan. 21, 2014, PCT/US11/63587, filed Dec. 6, 2011, published as US Patent Application Publication No. 2013/0296021 A1, and PCT/US12/50204 filed Aug. 9, 2012, published as US Patent Application Publication No. 2013/0260871 A1, each disclosure of which is hereby incorporated by reference in its entirety.

Figure 7:
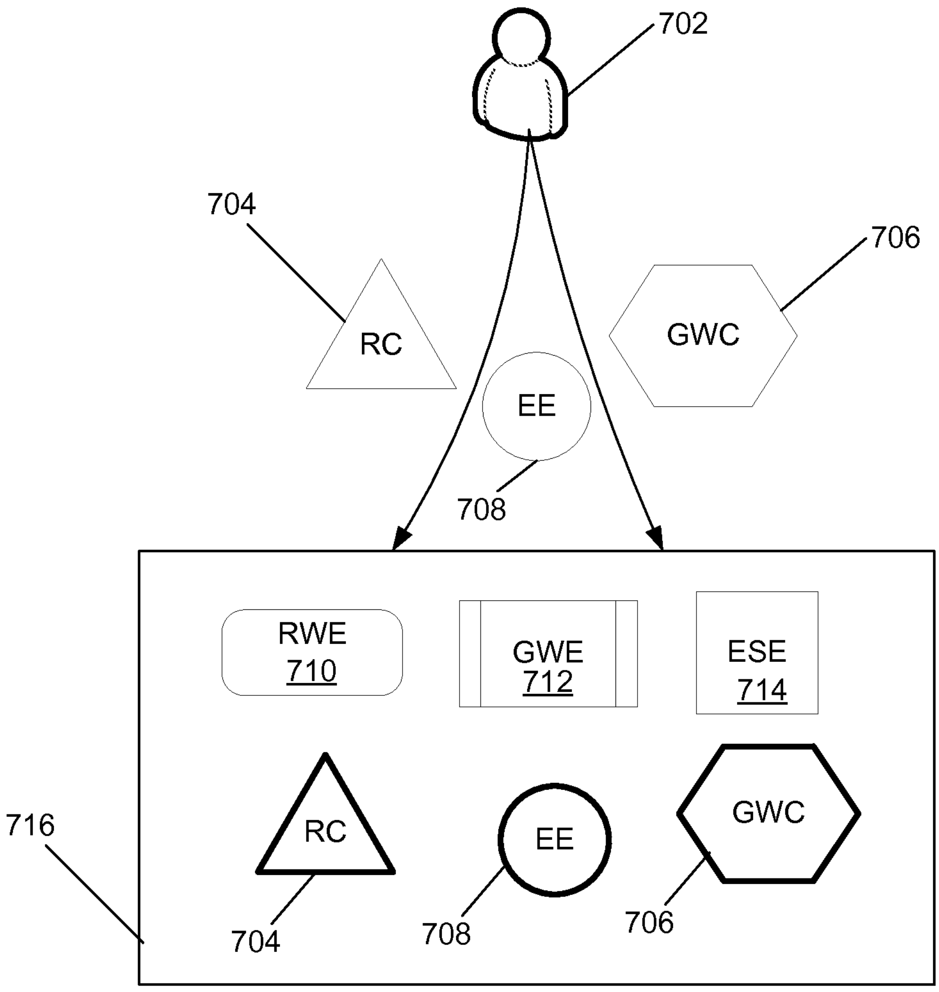
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
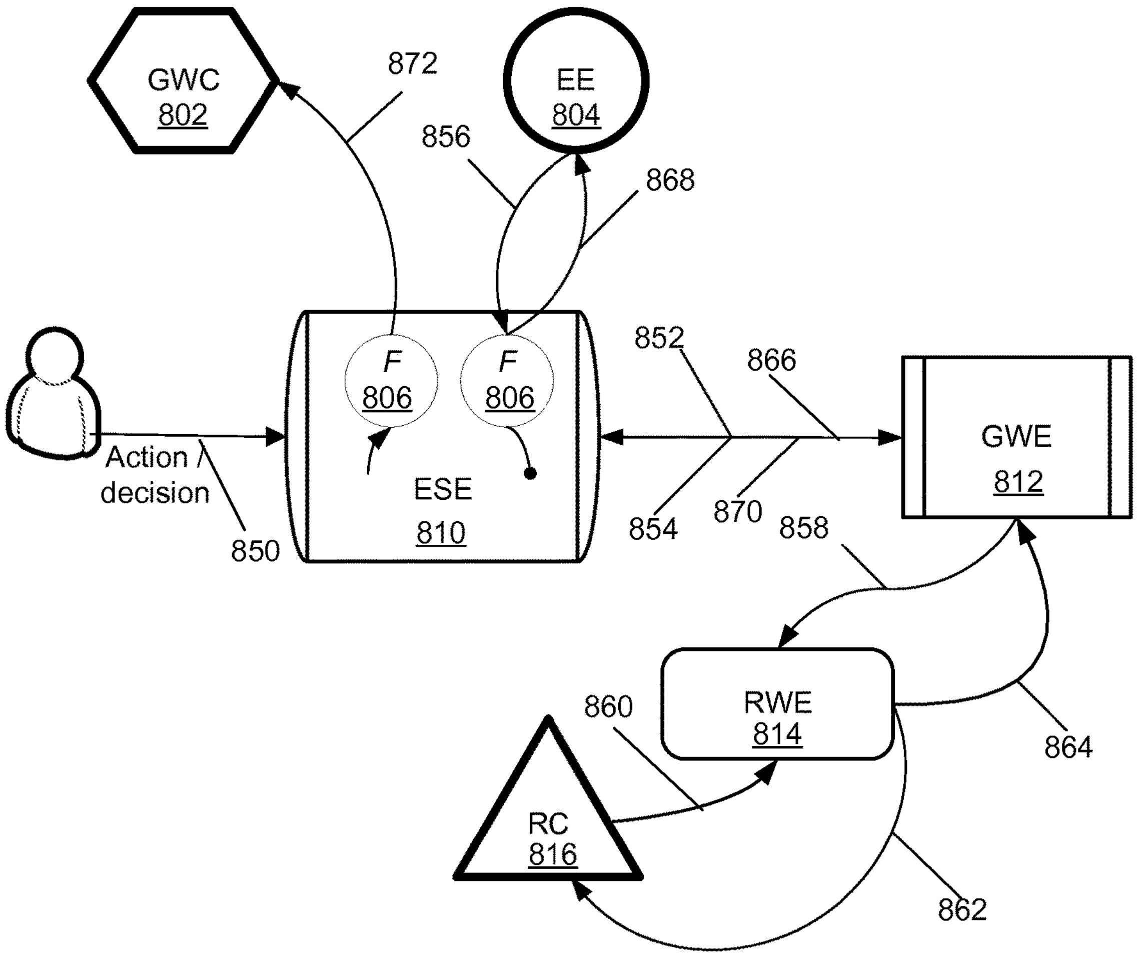
FIG. 8 illustrates a conceptual diagram of the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during gameplay. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
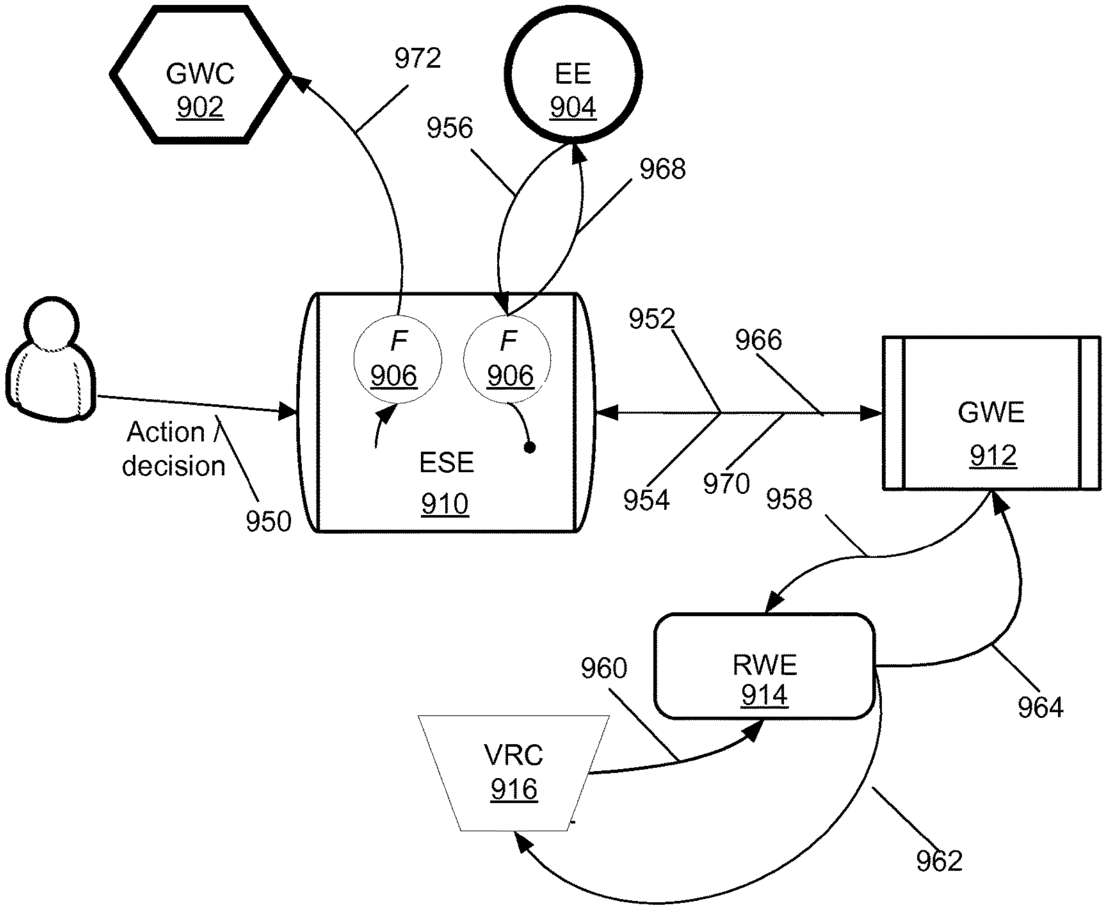
FIG. 9 illustrates a conceptual diagram of the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
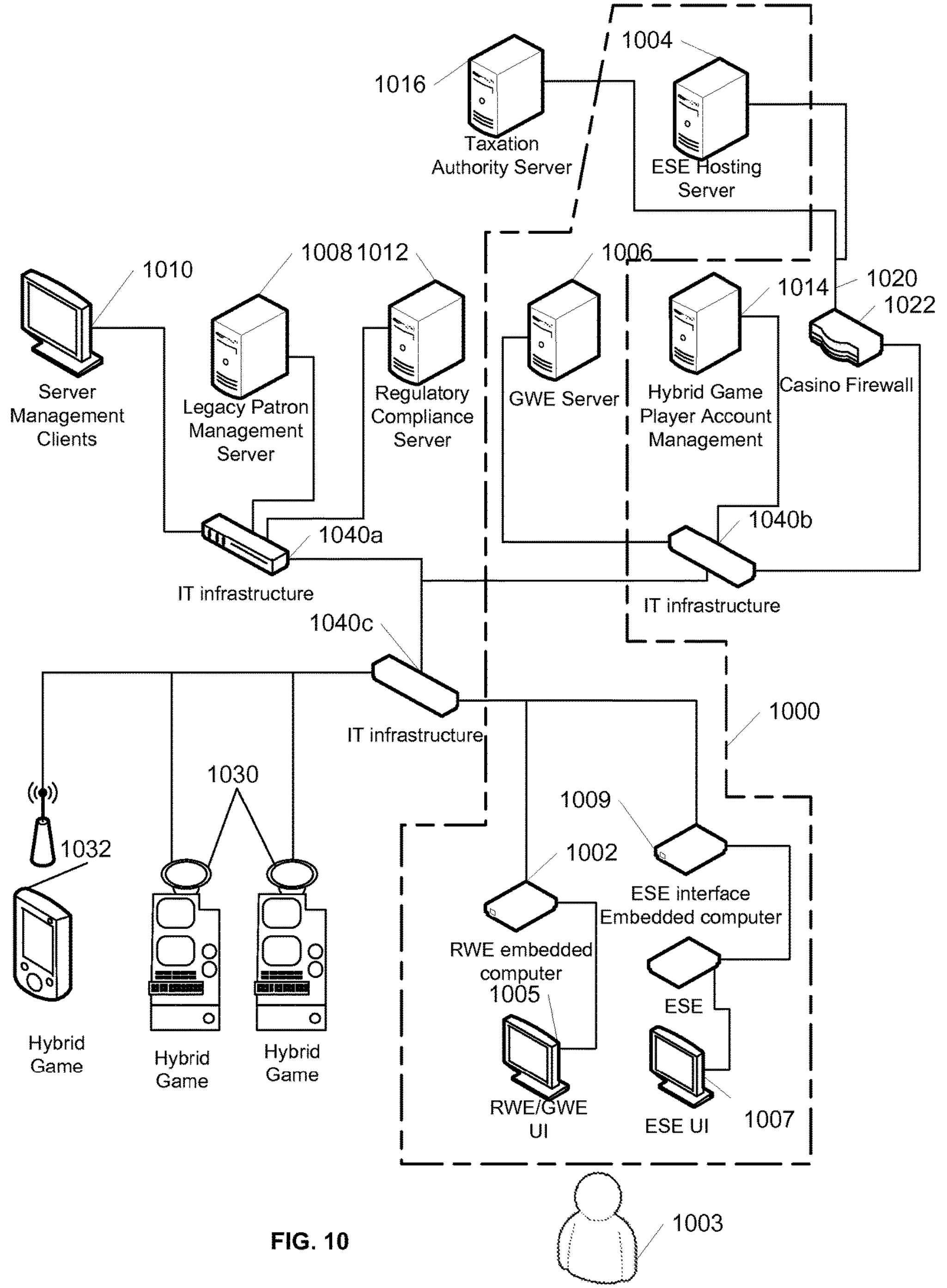
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to llustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
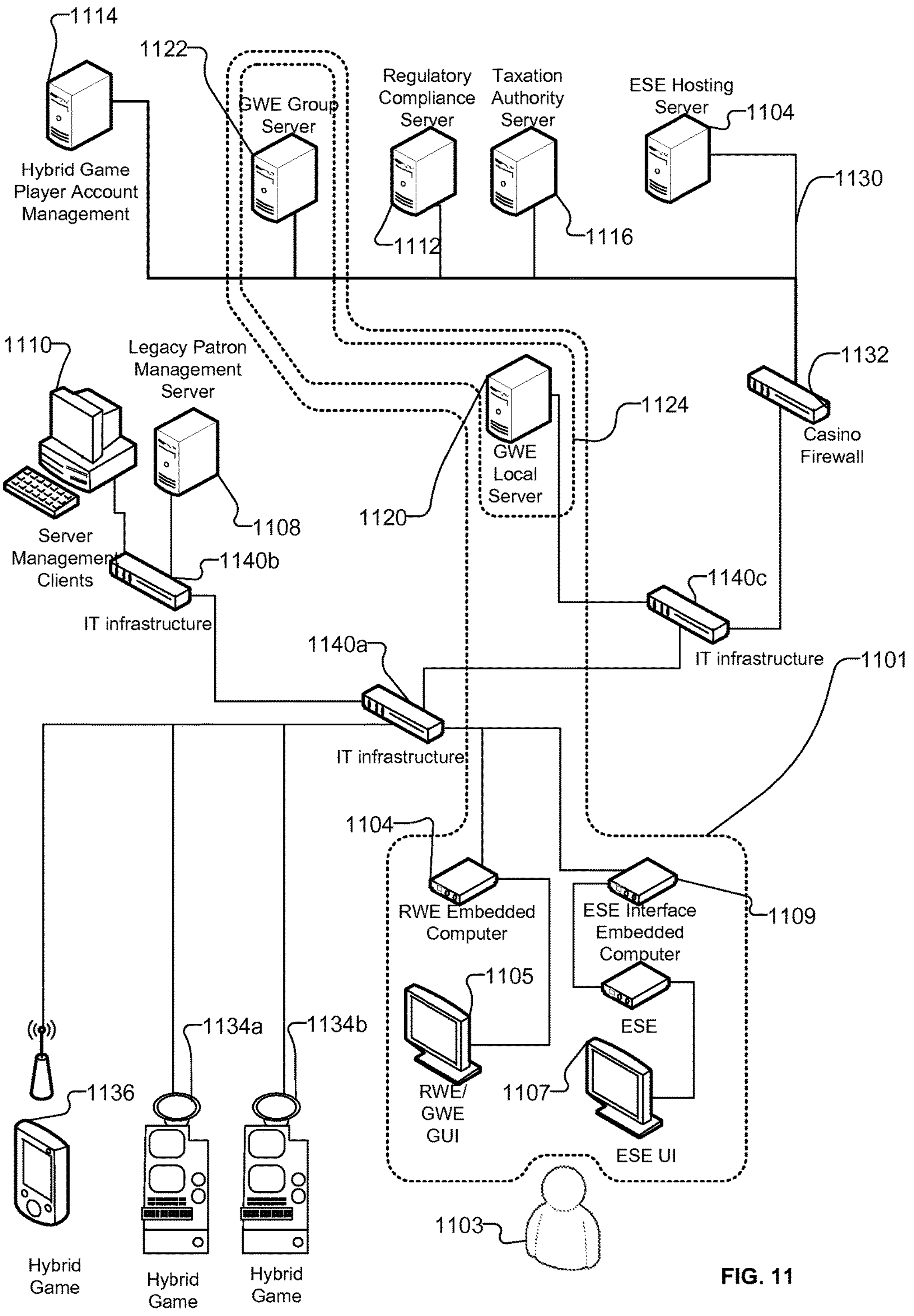
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
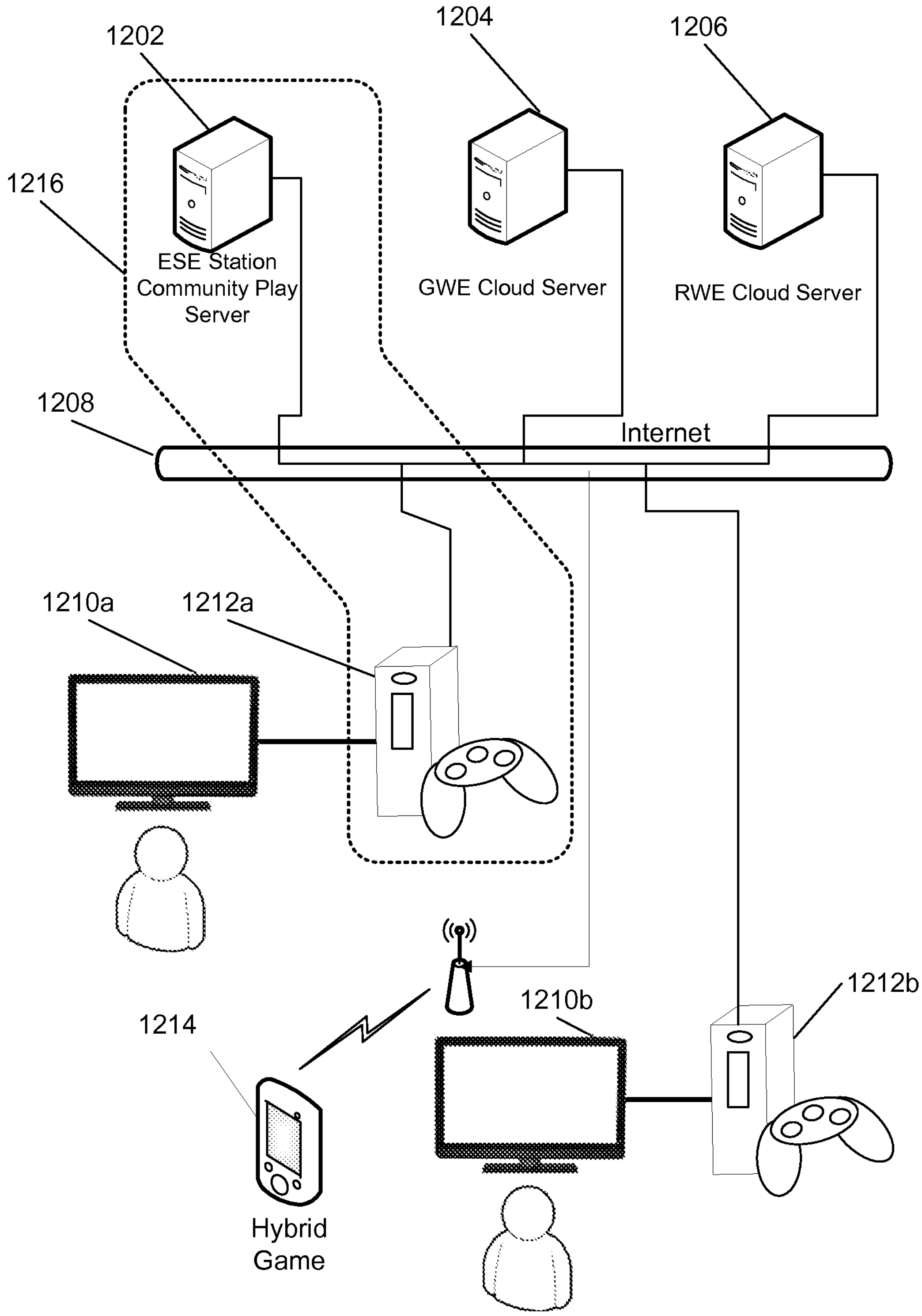
FIG. 12 illustrates a system diagram of an implementation of a cloud based gambling hybrid game in accordance with an embodiment of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of gambling hybrid games over the Internet 1208. Each gambling hybrid game includes a local ESE 1212*a* or 1212*b* (such as, but not limited to, a video game console or a gaming computer system) that interfaces with a remote ESE server 1002. Processes performed by an ESE 1212*a* services can be performed in multiple locations, such as, but not limited to, remotely on an ESE server 1202 and locally on a local ESE 1212*a*. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
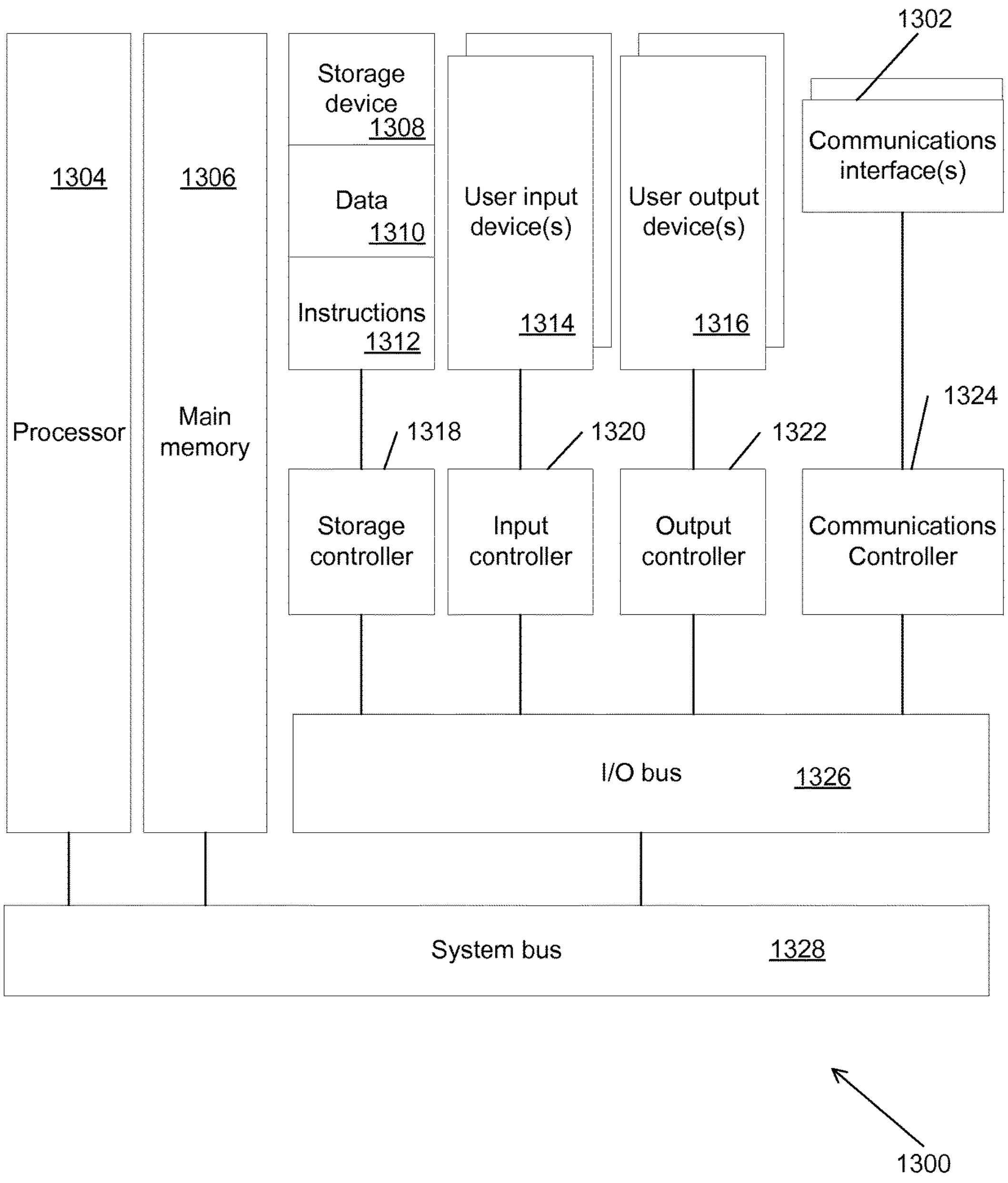
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, a server, a client, a mobile device such as a smartphone, a personal digital assistant or the like, a wireless device such as a tablet computer or the like, an electronic gaming machine, a general purpose computer, a gaming console, a computing device and/or a controller. A processing apparatus that is constructed to implement a gambling hybrid game in accordance with embodiments of the invention is illustrated in FIG. 13. In the processing apparatus 1300, a processor 1304 is coupled to memory 1306 by a bus 1328. The processor 1304 is also coupled to non-transitory machine-readable storage media, such as a storage device 1308 that stores executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game(such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Gambling Hybrid Games Including Gambling Intergrated Games

In accordance with many embodiments of the invention, a gambling hybrid game provides an entertainment game and a gambling game. A wide array of entertainment games include explicit random events that are observable to the game's player(s) and often initiated by a player. Random events can include, but are not limited to, the drawing of cards, the rolling of a die, and the use of a spinner. These explicit random events can be singular or multiple, operating in parallel or in serial. For example, Monopoly® provided by Hasbro Inc. of Pawtucket, R.I. is played by each player rolling a pair of dice at the onset of each turn to move a game piece around the board (singular per turn, and serially between players). In Risk® provided by Hasbro Inc. of Pawtucket, R.I., two players roll dice simultaneously to establish the outcome of a battle, and the players continue to roll dice until the battle is resolved (parallel dice rolls occurring multiple times). In Scrabble® provided by Hasbro Inc. of Pawtucket, R.I., a player draws tiles at random from a pool of tiles. In War, players draw randomly ordered cards from a deck of cards and compare those cards each turn. These random events are typically initiated by a player as part of a player's turn and can drive actions such as the movement of a player piece around a board (e.g. Monopoly®), the resolution of a battle between players (e.g. Risk®), establishing whether a character successfully deploys a specific skill (e.g. Dungeons and Dragons®), etc. Although the above examples discussed are board games, the same principle can be applied in computerized versions of these games.

Figure 14:
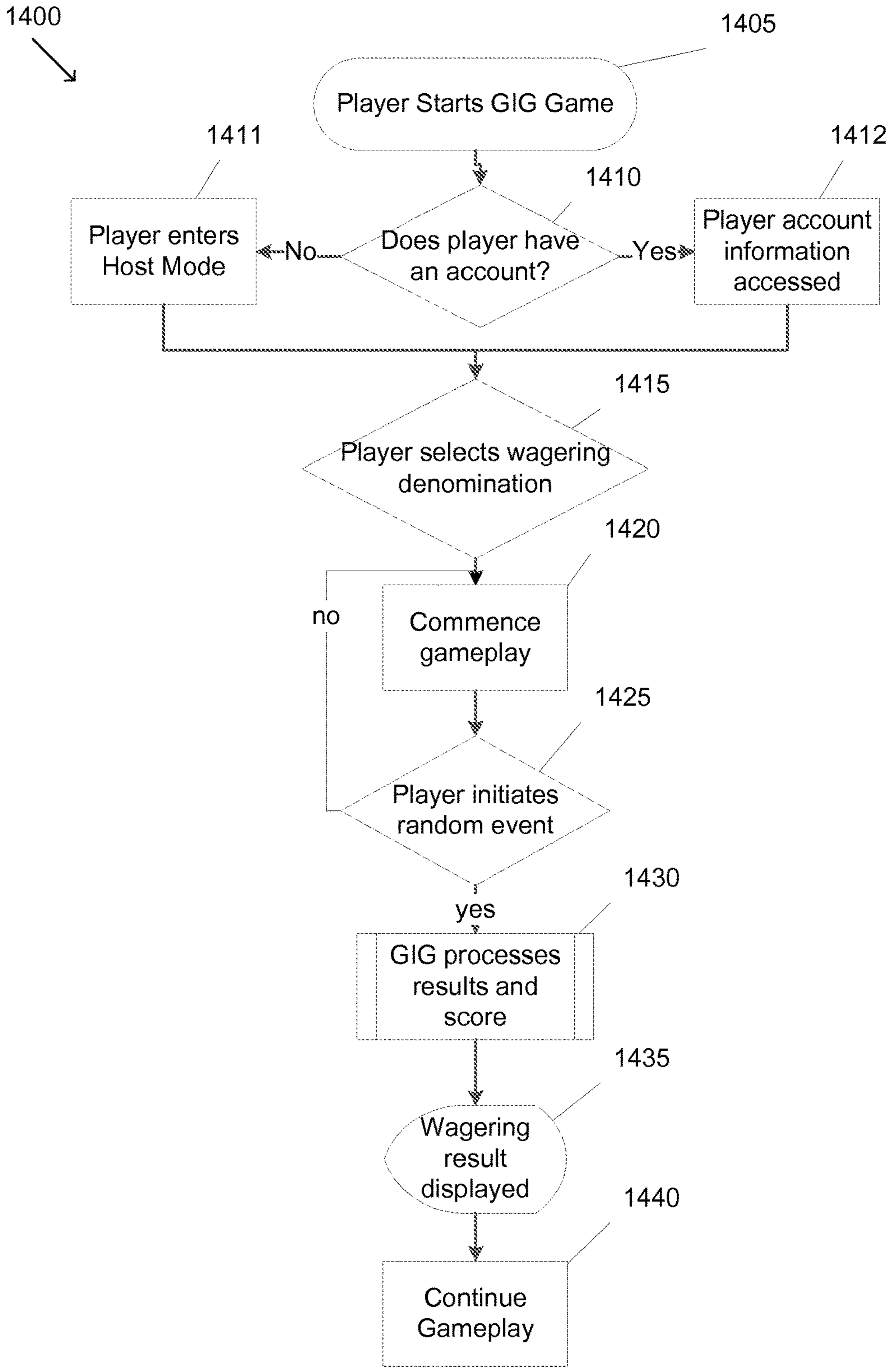
FIG. 14 illustrates a flow diagram of a gambling hybrid game with a gambling integrated game in accordance with an embodiment of the invention.

In accordance with several embodiments of the invention, the explicit random events in an entertainment game provided by a gambling hybrid game are harnessed to drive gambling events in a gambling game in concert with the play of the entertainment game. For purposes of this discussion, a gambling hybrid game that uses the random events in an entertainment game to determine the results of the gambling event and/or wagers on the gambling event are referred to as a Gambling Integrated Game (GIG). A GIG uses the random events inherent in the underlying entertainment game as a gambling game where the outcome of a random event or a set of random events in the entertainment game is linked to the provisions of awards to a player. Examples of awards in accordance with embodiments of the invention include, but are not limited to, in-game objects, the alteration of in-game variables, and the allocation of credits to one or more pools being collected by the game operator (i.e. casino). A flow diagram of a process for providing a gambling hybrid game with a GIG in accordance with embodiments of the invention is illustrated in FIG. 14.

In process 1400, the player begins play of the gambling hybrid game (1405). Upon starting the game, the player selects (1410) between using either a player account to provide Real World Credits (RWC) and/or game world credits (GWC) for play (1412) or may play a stand-alone or host version (1411) of the game in which RWC and/or GWC is entered on a per-play basis. Regardless of the selected type of game play, the player then chooses the denominations or wagering amount to use during game play (1415). The ESE then provides the game play of the entertainment game (1420). During game play of the entertainment game, the player initiates a random event (1425).

The results of the random event are generated and the awards and/or wager results in the gambling game based upon the random event are determined. The results of the wagers and/or awards are provided to the player and displayed as part of the game play (1435). For example, a gambling hybrid game with a gambling integrated game provides a computerized version of a board game wherein object of the game is to advance around a board, acquiring spaces on the board, and charging rents to other players who land on the acquired spaces, such as in the game of Monopoly®. In the game, a player rolls two 6-sided die each turn. In addition to dictating how far the player moves his piece in the entertainment game, the dice roll determines which one of the 36 possible permutations (where die 1 and die 2 are called out separately) or 21 permutations (where only sum of the dice is called out) corresponds to a specific monetary payout relative to the credits committed to the gambling game before the dice were "rolled" in a GIG version of the electronic board game. In accordance with some embodiments of an electronic board game GIG, each of the 36 or 21 possible permutations correspond to at least one of a payout to the player, a possible allocation to a bonus pool, the alteration of an in-game variable, a loss of funds by the player, and a gain of funds by the player.

In accordance with some embodiments, the results of wagers and/or awards can include, but are not limited to contribution to a bonus pool that is awarded as a function of subsequent random events; a RC win for the player; a RC loss for the player; a RC draw for the player; a contribution to a bonus pool that is awarded as a function of player skill and/or as a function of a player's performance in one or more instances of the entertainment game; a contribution to an interstitial credit, such as Quanta, that the player can use in the current game session and/or over multiple game sessions to alter entertainment game variables; a contribution to a specific entertainment game variable without player selection or input; and a contribution to a bonus pool that is applied to a subsequent competition or tournament that the player may or may not become eligible to enter based upon factors including, but not limited to, the demonstrated skill of the player in the entertainment game, money committed to the gambling game, hours spent playing the game, and player club status. In accordance with some embodiments, the award and/or wager may be provided in lieu of the random event affecting the entertainment game. For example, the player may gain the ability to move their piece or one of the above effects may take place in a gambling hybrid game providing an electronic board game as an entertainment game in accordance with an embodiment of the invention. In accordance with the embodiment, the results of the random event may be affected by direct allocation of each possible random outcome to one of the above mentioned outcomes in a gambling game or a move in the entertainment game. For example, a first die roll of a "2" and a second die roll of a "5" may result in a RC win and no longer provide a move of seven squares in the Monopoly game. In accordance with some embodiments, an addition of an additional random number generating element (a third die for example) is introduced into the entertainment game that causes the fundamental random number generating element (the two dice) to be interpreted as either a conventional move in the underlying entertainment game, or instead as one of the above effects. In accordance with a number of embodiments, the impact of the underlying explicit random number generating mechanism in the entertainment game may be accumulated over multiple occurrences of the explicit random events in the entertainment game. For example, rather than the outcome of a single roll of the dice by a player during a player turn in an electronic board game employing two six-sided dice which would limit the outcome to one of 36 distinct outcomes, the results of multiple dice rolls accumulated across several turns may be considered at one time so that a greater number of permutations of the result are possible. For example, six rolls of the two dice by a single player or the rolls from six player turns may be used to drive the Random Effect to provide 612 possible outcomes. After the results of the random event are determined and displayed, game play of the entertainment game continues (1440).

Although specific processes for providing gambling hybrid games with a GIG are discussed above with respect to FIG. 14, any of a variety of processes for providing a gambling hybrid game with a GIG can be utilized as appropriate to the requirements of specific applications in accordance with embodiments of this invention.

Figure 15:
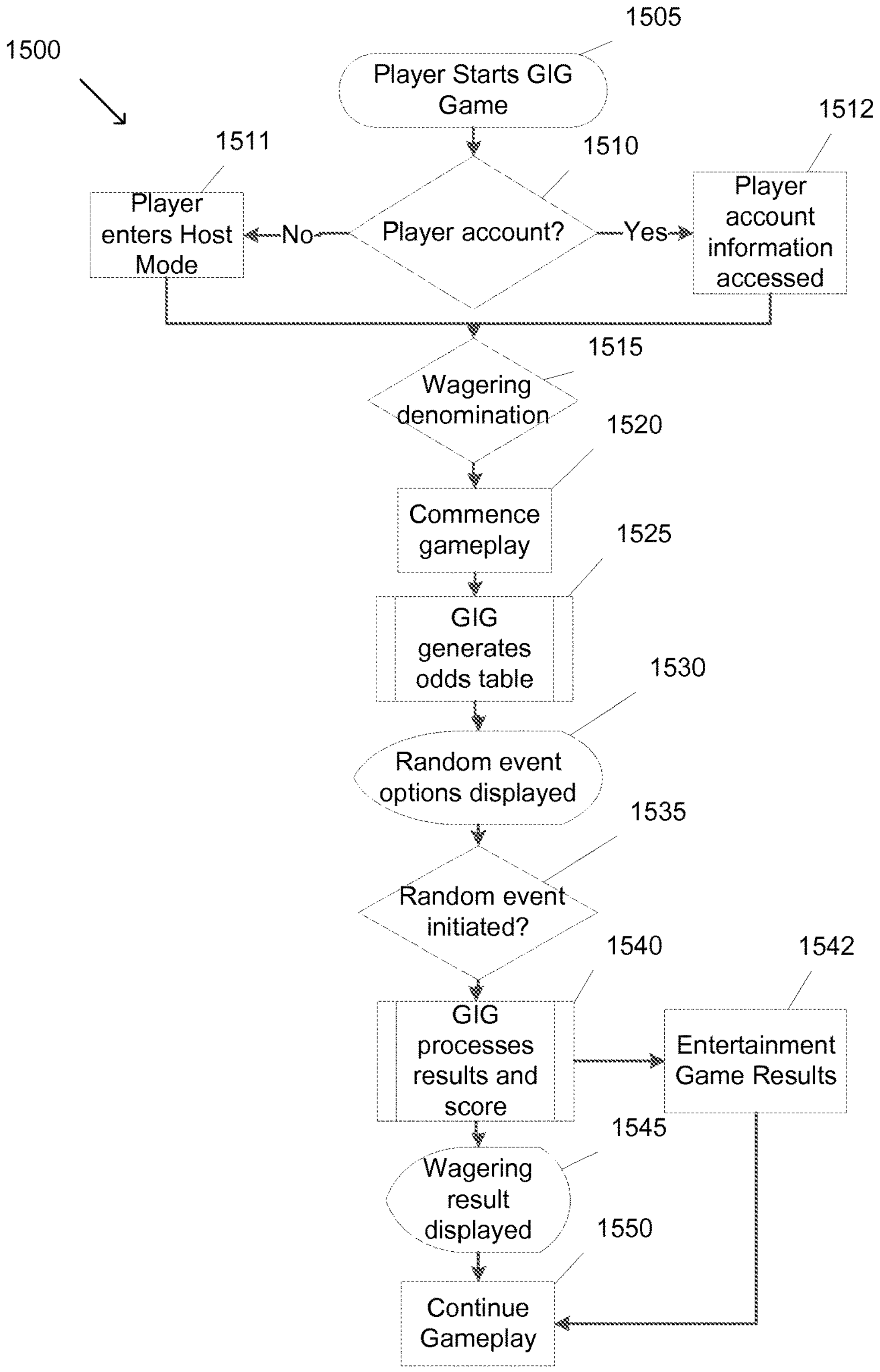
FIG. 15 illustrates a flow diagram of a gambling hybrid game with a gambling integrated game in accordance with another embodiment of the invention.

In accordance with some embodiments, the entertainment game in a gambling hybrid game with a GIG has different random events that may be initiated at a given time. The results of a gambling event corresponding to the random event may depend on the odds associated the random event initiated. A flow diagram of a process for providing a GIG with different odds for a random event in accordance with an embodiment of the invention is shown in FIG. 15.

In process 1500, the player begins play the gambling hybrid game (1505). Upon starting the game, the player selects (1510) between using either a player account to provide Real World Credits (RWC) and/or game world credits (GWC) for play (1512) or may play a stand-alone or host version (1511) of the game in which RWC and/or GWC is entered on a per-play basis. Regardless of the selected type of game play, the player chooses the denominations or wagering amount to use during game play (1515). The entertainment engine then provides the game play of the entertainment game (1520). The odds for each random event option are then determined for the GIG (1525) and displayed to the player (1530). During game play, the player initiates a random event from the random event options (1535). The results of the initiated random event are generated and the awards in the gambling game based upon the random event are determined. The results of any wagers and/or rewards are provided to the player and displayed as part of the game play (1540). The results of the random event on game play of the entertainment are determined (1542). The determined outcomes of wagers and/or awards provided to the player based upon the random event are displayed (1545) and game play of the entertainment game continues (1540). The determination of the results of the random event is performed in a manner similar to the determination described above with reference to FIG. 14.

Although a specific process for providing a gambling hybrid game with a GIG is discussed above with respect to FIG. 15, any of a variety of processes for providing a gambling hybrid game with a GIG can be utilized as appropriate to the requirements of specific applications in accordance with embodiments of this invention.

Figure 16:
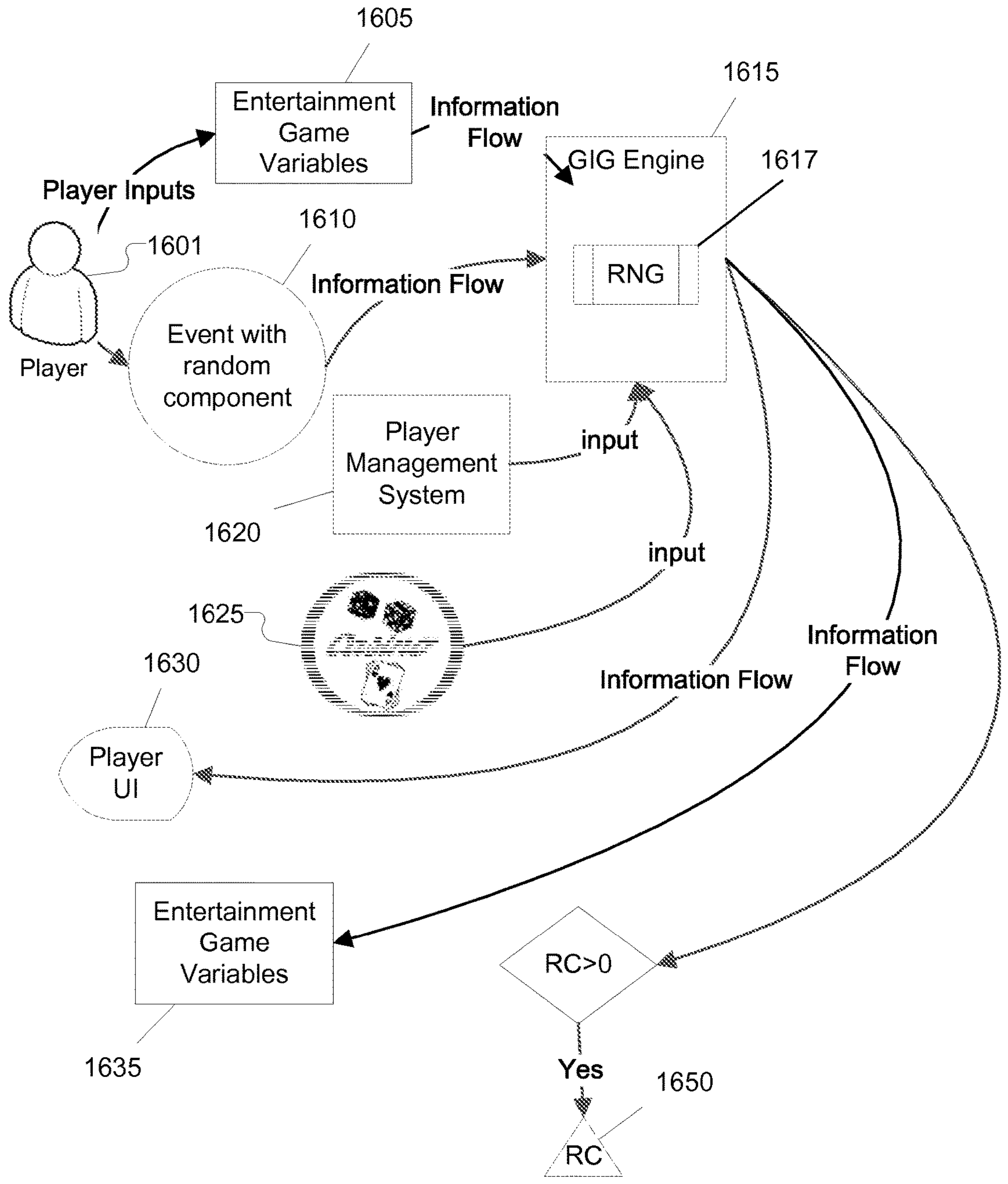
FIG. 16 illustrates a diagram showing a gambling hybrid game with a gambling integrated game engine; and the inputs and outputs of a gambling integrated game engine in accordance with an in an embodiment of the invention.

In accordance with many embodiments of the invention, the determination of the payout of a wager and/or award based upon the results of a random event in the entertainment game may be influenced by other information. This information includes, but is not limited to, Entertainment Game (EG) variables; player information; and casino and/or game provider information. A flow diagram showing the passing of information during the provision of a gambling hybrid game with a GIG in accordance with embodiments of this invention is illustrated in FIG. 16.

Player 1601 provides player inputs to the entertainment game. The inputs cause the entertainment game to update EG variables 1605 that indicate the state of the entertainment game. The player inputs also initiate an event with a random component 1610. EG variables 1605 and information about the event with a random component 1610 are provided to a GIG engine. The GIG engine also receives player information from a player management system 1620 and provider information from a casino and/or a game provider 1615. Random Number Generator (RNG) 1617 can be used to determine the results of the event with a random component 1610 in the entertainment game and the gambling game. The entertainment game uses the results of the event with a random component to update the EG variables 1635 and the player user interface 1630. The gambling game uses the results of the event with a random component to determine the results of the gambling event 1645 and any RC 1650 rewarded for wagers based upon the results of the gambling game.

Figure 17:
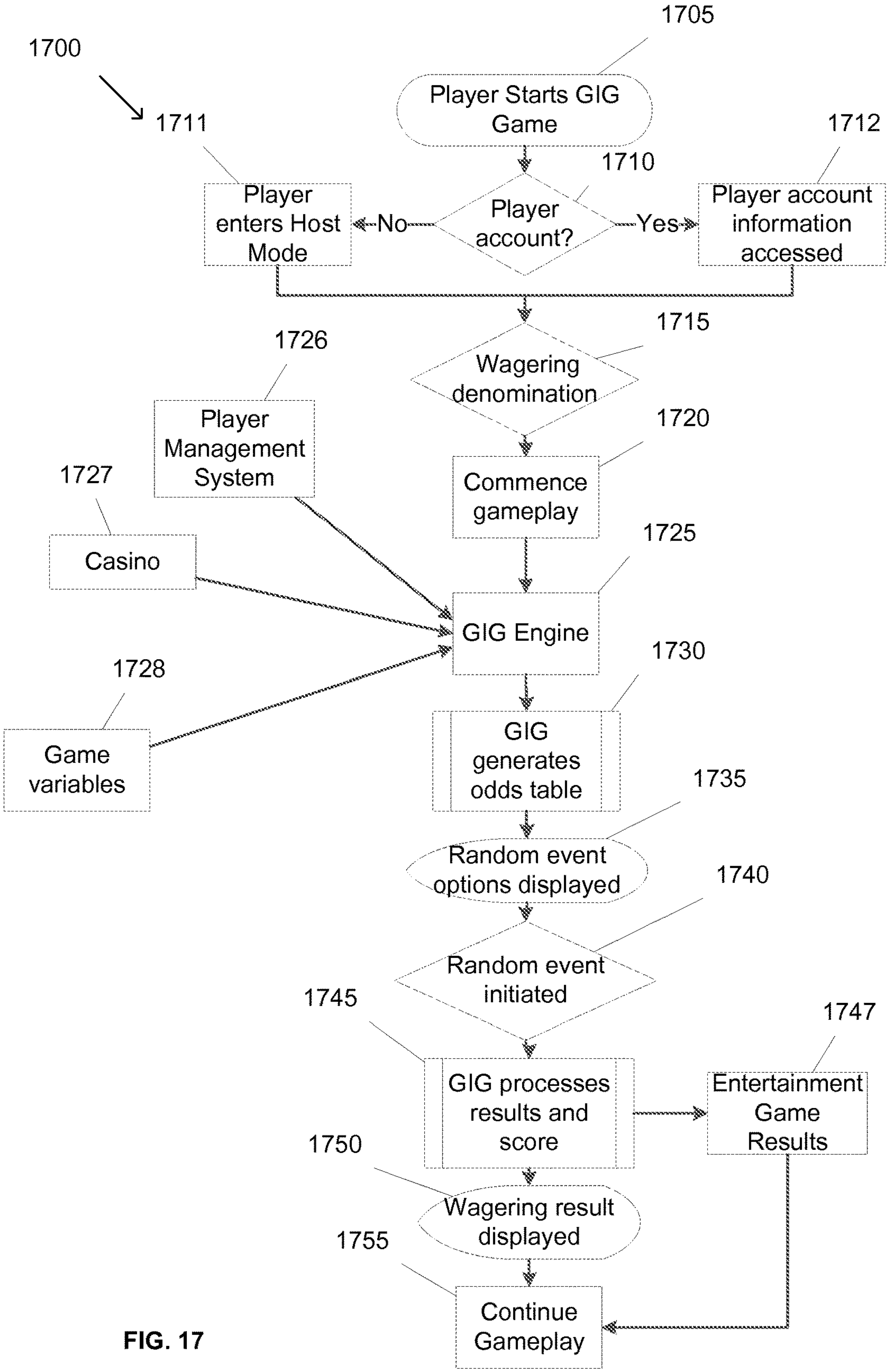
FIG. 17 illustrates a flow diagram of a gambling hybrid game with a gambling integrated game having a gambling integrated game engine in accordance with another embodiment of the invention.

A flow diagram of a process for providing a GIG that uses the results of a random event and other information to determine the results of the random event in the entertainment game to determine results in a gambling event in a gambling game in accordance with an embodiment of the invention is shown in FIG. 17.

In process 1700, the player begins play of the gambling hybrid game (1705). Upon starting the game, the player selects (1710) between using either a player account to provide Real World Credits (RWC) and/or game world credits (GWC) for play (1712) or may play a stand-alone or host version (1711) of the game in which RWC and/or GWC is entered on a per-play basis. Regardless of the selected type of game play, the player chooses the denominations or wagering amount to use during game play (1715). The entertainment engine then provides the game play of the entertainment game (1720). The GIG engine receives player information from player management system 1726, EG variables 1728 from the ESE and provider information from the casino or game provider 1727. The odds for each random event option may then be determined for the GIG using the player information, provider information, EG variables, and other entertainment game information (1730) and displayed to the player (1735). During game play, the player initiates a random event from the random event options (1740). The results of the initiated random event are determined and the awards in the gambling game based upon the random event, the player information, provider information, and EG variables are determined and the results of any wagers and/or rewards are provided to the player and displayed as part of the game play (1745). The results of the random event on game play of the entertainment are determined (1747). The results of the wagers and/or awards provided to the player based upon the random event are displayed (1750) and game play of the entertainment game continues (1755).

Although a specific process for providing a gambling hybrid game with a GIG is discussed above with respect to FIG. 17, any of a variety of processes for providing a gambling hybrid game with a GIG can be utilized as appropriate to the requirements of specific applications in accordance with embodiments of this invention.

Examples of Gambling Hybrid Games with a GIG

Figure 18:
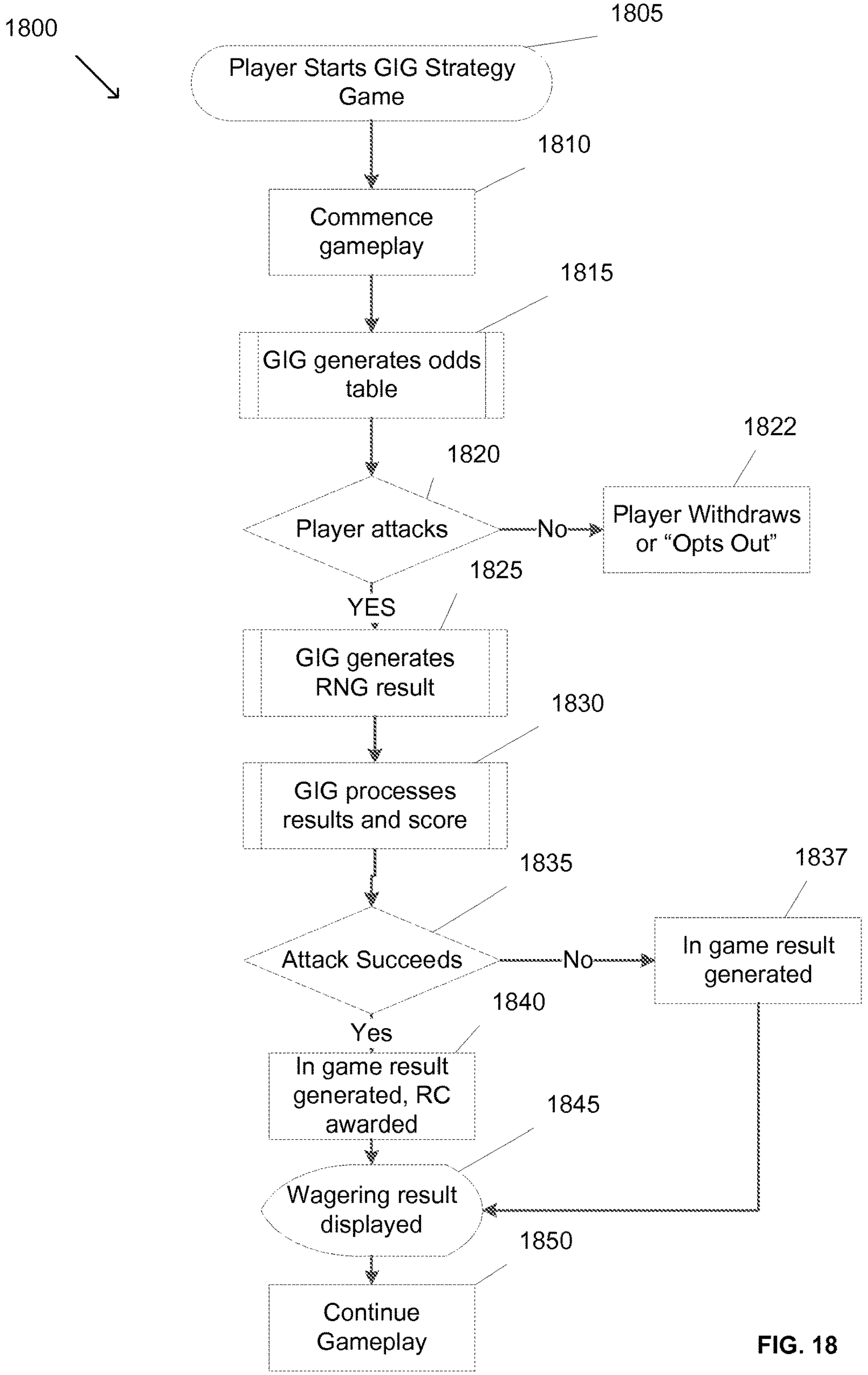
FIG. 18 illustrates a flow diagram of a gambling hybrid game with a gambling integrated game that provides a strategy game as the entertainment game in accordance with another embodiment of the invention.

In accordance with some embodiments of a gambling hybrid games with a GIG, the entertainment game provided is a strategy-based game. A flow diagram of a process for providing a GIG with a strategy-based game as the entertainment game is shown in FIG. 18. In process 1800, the player initiates the strategy-based entertainment game (1805). Game play of the strategy-based game commences (1810). As game play proceeds, the GIG generates an odds table for a random event. The player then initiates the random event (1820). An example of a random event in A strategy-based game is when a player attacks a country on the game board occupied by a troop of another player. The attack continues until the player wins or withdraws (1822). For each roll of the dice during the attack, the GIG generates a random result using the RNG (1825). The GIG then processes the results of the random event in the gambling game and the results of the random event in the entertainment game (1830). If the attack fails (1837), the in-game results are recorded and game play of the entertainment game continues (1850). If the attack is successful, the in-game results of the successful attack are recorded and the award and/or results of wagers in the gambling game are determined (1840). The awards and/or results of the wagers are displayed (1845) and game play of the entertainment game continues (1850).

Although a specific process for providing a gambling hybrid game with a GIG providing a strategy game as the entertainment game is discussed above with respect to FIG. 18, any of a variety of processes for providing a gambling hybrid game with a GIG can be utilized as appropriate to the requirements of specific applications in accordance with embodiments of this invention.

In accordance with an embodiment of a gambling hybrid game with a GIG that provides a strategy game as the entertainment game, players engage in battles between groups of armies using one, two or three dice each, depending upon the number of armies each player is using to attack or defend. Over the course of a battle, there can be multiple rolls of the dice until one party is victorious or the attacker withdraws. The set of combinations of dice are known as a function of the number of troops each party uses in the battle. Each party is required in this example to contribute a specific sum of RC to each battle as a function of the number of troops that the party has committed to that battle as a whole in accordance with the embodiment. Flowever, in accordance with other embodiments, RC is committed at a fixed amount per battle regardless of the number of troops committed. In accordance with still other embodiments, the amount of RC committed is a function of the number of dice rolled during each round of a battle. The combination of dice outcomes can be used to drive one or more of the following: a contribution to a pool to be paid to the winner of the specific head-to-head battle; a contribution to a tournament pool to which the players may or may not ultimately gain entry; and a contribution to a pool to be paid to the winner of the specific game. In several embodiments, there is no feedback from the gambling game to the entertainment game other than that already inherent in the strategy-based game. In particular, the winner of the battle gains more territory and territory cards and may therefore ultimately receive more armies at the onset of the next turn of the winner. In accordance with other embodiments, one or more of the dice outcomes may cause a player to receive an award. Examples of awards include, but are not limited to additional armies; and special features including, but not limited to, extra attack dice for an attach, better attack odds, and better defending odds.

In another particular example, Player 1 attacks Japan from Kamchatka with 10 troops. Player 2 defends Kamchatka with four troops. Therefore, Player 1 is required to commit 10 RC to the battle, and player 2 is required to commit four RC to the battle. The battle proceeds in the manner shown in the following table.

| Battle Round | Player 1 Troops at start of round | Player 2 Troops at start of round | Player 1 Dice Rolls | Player 2 Dice Rolls |
|---|---|---|---|---|
| 1 | 10 | 4 | 2, 3, 4 | 3, 6 |
| 2 | 8 | 4 | 4, 4, 5 | 2, 6 |
| 3 | 7 | 3 | 2, 1, 3 | 5, 3 |
| 4 | 5 | 3 | 6, 5, 1 | 4, 5 |
| 5 | 5 | 1 | 3, 4, 2 | 4 |
| 6 | 4 | 1 | 6, 3, 4 | 5 |
| 7 | 4 | 0 | N/A | N/A |

As shown in the table, Player 1 takes over the country after six rounds of battle having lost six of his initial troops and Player 2 has lost all four of his troops. As a result of the battler the following random effects result in accordance with the embodiment:

A Victory Bonus—Player 1 receives a credit back from her commitment as a function of having won the battle. 1 credit returned to player 1;

A Strong Defender Bonus—Player 2 receives a credit back from his commitment as a function of having lost fewer troops than player 1. One credit to player 2; and Game Victory Pool—1 credit from the attacking player (Player 1) is committed to a pool at the onset of the battle that will be awarded to the ultimate winner of the strategy-based game.

The gambling outcome for Player 1 in the example is determined in the following manner. 8 RC from Player 1 are committed to the random outcome that is ultimately determined by the numerical sequence {2,3,4,4,4,5,2,1,3,6,5,1,3,4,2,6,3,4}. The numerical sequence is looked up in a table that can be dynamically generated at the onset of the battle. The table reflects all the possible outcomes of the engagement (including either player withdrawing before being defeated) with regards to rolls of Player 1. Prizes are allocated to each possible numerical combination in the table as a function of a prescribed distribution of outcomes dictated by the game. The prizes may be RC; in-game variables; in-game objects; or other items of value in accordance with the embodiment. The outcome of the process may be represented to Player 1 graphically through a variety of means including, but not limited to, a graphical representation of a slot machine or other gambling game. In the specific example, Player 1 loses the gambling game and is not awarded any RC.

The gambling outcome for Player 2 is determined in the following manner. 3 RC from Player 2 are committed to the random outcome that is ultimately determined by the numerical sequence {3,6,2,6,5,3,4,5,4,5}. The numerical sequence is looked up in a table that can be dynamically generated at the onset of the battle, and which reflects all the possible outcomes of that engagement (including Player 2 withdrawing before being conquered) with regards to the rolls of Player 2. Prizes are allocated to each possible numerical combination in the table as a function of a prescribed distribution of outcomes dictated by the game. The prizes may be RC; in-game variables; in-game objects; or other items of value in accordance with the embodiment. The outcome of this process may be represented to Player 2 graphically through a variety of means including, but not limited to, a graphical representation of a slot machine or other gambling game. In this specific example, Player 2 wins the gambling game and is awarded 10 RC.

In the net, Player 1 loses 9 RCs net as a result of the battle and Player 2 gains 7 RCs. Further, 1 RC is allocated to a pool for the ultimate winner of the strategy-based game.

In accordance with another embodiment of a gambling hybrid game with a GIG and providing A strategy-based as the entertainment game, an attack by Player 1 on a country protected by Player 2 is performed in the following manner. When player 1 attacks player 2 with a given number of troops on each side, the probability of Player 1 winning is at a known maximum. The probability can be less in so far as Player 1 may withdraw without completing the battle. However, maximum probability of Player 1 winning is known, and more specifically, the likelihood of Player 1 winning with N troops remaining is known. A following table can be constructed and shown to Player 1 before (or after) troops are committed to the battle given the number of troops that Player 1 and Player 2 each have committed to the battle (ten and four respectively). The following table shows the odd of Player 1 winning with N troops remaining.

| N | Percentage Odds of Winning with N troops remaining |
|---|---|
| 10 | 0.04% |
| 9 | 0.4% |
| 8 | 6% |
| 7 | 12% |
| 6 | 14% |
| 5 | 18% |
| 4 | 21% |
| 3 | 15% |
| 2 | 14% |
| 1 | 5% |

The above percentages are for exemplary purposes only and do not add to 100% because there is also the prospect of the Player 1 losing the battle. The following table adds a third column and an additional data point (the case of withdrawal or loss) to the above table to show Player 1 the credits awarded for a 10 credit bet based on the outcome of the battle. This table will be generated by the game logic with input from the casino, regulator, and/or other providers to reflect the desired gambling performance/volatility of the game. In accordance with this embodiment, only the attacking party will have a gambling game initiated as a function of committing troops to the battle. However, it is possible to provide a similar gambling game to the defending party using a similar process in accordance with some embodiments. Furthermore, the percentage odds in the second column could be represented to the player as odds as opposed to percentages in accordance with some embodiments. For example, the table could show "1-in-500" instead of "0.2%".

| N | Percentage Odds of Winning with N troops remaining | Payout on10 committed credits |
|---|---|---|
| 10 | 0.2% | 1000 |
| 9 | 4% | 250 |
| 8 | 12% | 100 |
| 7 | 11% | 11 |
| 6 | 10% | 10 |
| 5 | 7% | 8 |
| 4 | 5% | 1 |
| 3 | 5% | 0 |
| 2 | 4% | 0 |
| 1 | 3% | 0 |
| LOSS OR WITHDRAWAL | 36.8% | 0 |

In the above table, the percentages are for exemplary purposes only.

Player 1 commits to the battle after looking at the above table and the battle plays out in step-wise fashion where the attacker decides whether to continue or withdraw after each roll. In accordance with the embodiment, the attacker's funds are committed, and withdrawal at any time leads to a complete loss of the committed funds. However, the game may provide the player with an "opt out" after each round where the player would lose some but not all of the committed credits in accordance with some embodiments. For example, Player 1 may want to "opt out" after a single round of the battle in response to a roll of the three die that led to the loss two troops. Player 1 may "opt out" at the cost of 5 RC or some other substantial penalty).

Once the battle is complete, Player 1 is paid out according to the above table. As in the previous embodiment, a portion of the funds committed by the player may also be allocated to a number of different pools. For example, a single credit may be allocated to a pool to be awarded to the overarching winner of the Strategy-based game in accordance with the embodiment. Another credit may be awarded to the defender for winning the battle in accordance with the embodiment. If the defender wins the battle the credit, as with all, may be allocated from an overarching pool as controlled by the game and/or casino; or may be directly shifted from Player 1 to Player 2 depending on the embodiment. Another credit may be allocated to a tournament pool in accordance with the embodiment. Allocations of credits played in a bonus round that relates to skill and/or gambling (i.e. luck) can also be made in accordance with some embodiments. Each type of allocation the funds can be drawn directly from player contributions or an overarching marketing pool that is not explicitly tied to the flow of credits during a given game session.

After Player 1 is paid out according to the above table, play continues as before. In accordance with this example, game play continues by Player 1 continuing the turn until complete. Player 2 then drafts armies, places the armies on the board, attacks adjacent enemy territories (and gambles) as desired, and then moves troops before ending his turn. The process is repeated for each player (including computer driven players) in the game until the game is completed.

In accordance with another embodiment of a gambling hybrid game with a GIG having A strategy-based as the entertainment game, the Strategy-based game may be implemented in a GIG context where the aforementioned table operates not in context of a payout for a specific battle victory scenario (e.g. a win with 7 troops remaining) but to pay out as a function of winning with at least X troops remaining. This may be simpler to convey to the player. The table for determining payouts is shown in the following table where the percentages herein are exemplary only and not meant to be representative of the actual odds associated with the outcomes in a Strategy-based game.

| Player 1 Battle Outcome | Percentage Odds | Payout on10 committed credits |
|---|---|---|
| Win with 10 troops remaining | 0.2% | 1000 |
| Win with 6+ troops remaining | 35% | 15 |
| Win with 6 > x > 3 troops remaining | 15% | 12 |

-continued

| Player 1 Battle Outcome | Percentage Odds | Payout on10 committed credits |
|---|---|---|
| Win with 3 or fewer troops | 10% | 5 |
| Lose or withdraw | | 0 |

One skilled in the art will recognize that the player need not be exposed to the odds explicitly when showing the possible payouts.

In accordance with still another embodiment of a gambling hybrid game with a GIG having A strategy-based as the entertainment game, a given battle consists of a number of rounds, or "attacks" made by the attacking player. For each attack, the attacking player can claw back a portion of a wager committed to the gambling game. The claw back is paid only if the player wins (or in some implementations wins or draws) the attack round and the player is paid as a function of the # of troops attacked relative to the # of troops defending as shown in the following general equation.

Claw Back per Attack Round=*f*(# of troops attacking, # of troops defending)

The following is an example of a specific clawback formula for game play in accordance with the embodiment:

A=# of troops attacking

D=# of troops defending

W=RC (or VC)committed to gambling game Claw Back per Attack Round=C*W*(D/A) where D<A Claw Back per Attack Round=C*W*(A/D) where D>A Where C is defined as C=0.1*(1/n)

n=attack round in the given battle (t. e. 1, 2, 3, etc.)

In accordance with some embodiments, the claw back process can be limited by the game logic and/or the casino to persist only for a maximum of n rounds (e.g. 10). The above is a single example, and it is possible to construct any other manner of formulaic approach, including approaches that increase the claw back with each ongoing attack round, rather than decrementing it.

Beyond the claw back process, a payout to a player winning the battle is established as a function of the # of die "rolled" during the battle at the end of the battle in accordance with a number of embodiments. A series of tiers may be set as a function of the number of die rolled and prizes are allocated to each tier in accordance with some embodiments. A table dictating the prizes for each tier is used to establish the payout in accordance with many of the embodiments. The prizes can vary as a function of the ultimate performance of the die rolls relative to a given table. The prizes may also vary from table to table to account for the number of die rolls in a battle. For example, a table for a battle that entailed 5 die rolls for the attacker would likely have a much lower maximum payout than a table that reflected a battle that entailed 20 die rolls.

An example of tables in accordance with an embodiment of the invention that account for the different amount of die rolls in a battle is given below. The payouts are different because of the amount of RC committed is based on the number of die rolled during the battle in accordance with the embodiment. Each die roll result (e.g. a 1, 2, 3, 4, 5 or 6) of a player is added together to ascertain a player's score. The score is then cross-referenced against a table to establish a payout based on the number of die rolls by the player. The first table shows a table for 20 die rolls in accordance with embodiments of the invention.

| Dice Roll Score for 20 Rolls | Payout on 20 committed credits |
|---|---|
| 110 <= X | 5,000 |
| 100 <= X < 110 | 2,000 |
| 80 <= X < 100 | 100 |
| X = 20 | 20,000 |
| X < 80, X ≠ 20 | 0 |
| Lose or withdraw | NIL |

The following table is for a battle that only entailed 5 dice rolls. The payouts are less than payouts on the first table because the odds associated with the various outcomes are much greater than in the 20 die case.

| Dice Roll Score for 5 Rolls | Payout on 5 committed credits |
|---|---|
| 27 < X | 500 |
| 25 <= X <= 27 | 100 |
| 20 <= X < 25 | 10 |
| X = 5 | 1000 |
| X < 20, X ≠ 5 | 0 |
| Lose or withdraw | NIL |

In addition to the gambling mechanisms in a GIG described for the above embodiments, GWC may be accumulated as a function of battles won in accordance with some embodiments. In many embodiments, any battle won would generate the same amount of GWC. In accordance with many embodiments, the payout of GWC is a function of the ratio of the number of initial troops of the winner of the battle relative to number of initial troops of the loser. GWC may also be awarded to a player losing a battle if the player's performance in the battle was "heroic" in accordance with a number of embodiments. For example, the player destroyed 20 attacking troops before losing the 3 defending troops. The amount of GWC and/or the player's ultimate status at the end of the game (1st place, 2nd, etc.) may dictate in whole or in part the awarding of a fixed or variable cash prize and/or count towards entry into a tournament (i.e. a player may need a fixed amount of GWC accumulated through The strategy-based game play to gain entry) in accordance with some embodiments of the invention. Other variables may also introduced by the casino could also affect the prize in accordance with a number of embodiments.

In some embodiments, a sequence of random events (such as dice rolls) in a portion of an entertainment game are provided for, and a gambling outcome (such as a payout) is generated as an accumulated result of those random events. In many such embodiments for electronic strategy-based games, a battle may consist of a number of different skirmishes. Each skirmish requires the rolling of dice (random events in the entertainment game) and the generation of an RNG result (random outcome in the gambling game.) At the end of each skirmish, the GIG may provide updated odds tables for the battle. Lower odds of winning in the entertainment game may be offset by higher possible payouts in a higher-volatility wager.

In some additional embodiments, a player may stake an ante on the battle. Leaving the battle after a skirmish may require the forfeiting of that ante.

In some embodiments, a battle may consist of a number of different skirmishes, the total sequence of serial dice rolls (the random events in the entertainment game) may be used to generate the RNG (the gamblifor the GIG.

Figure 19:
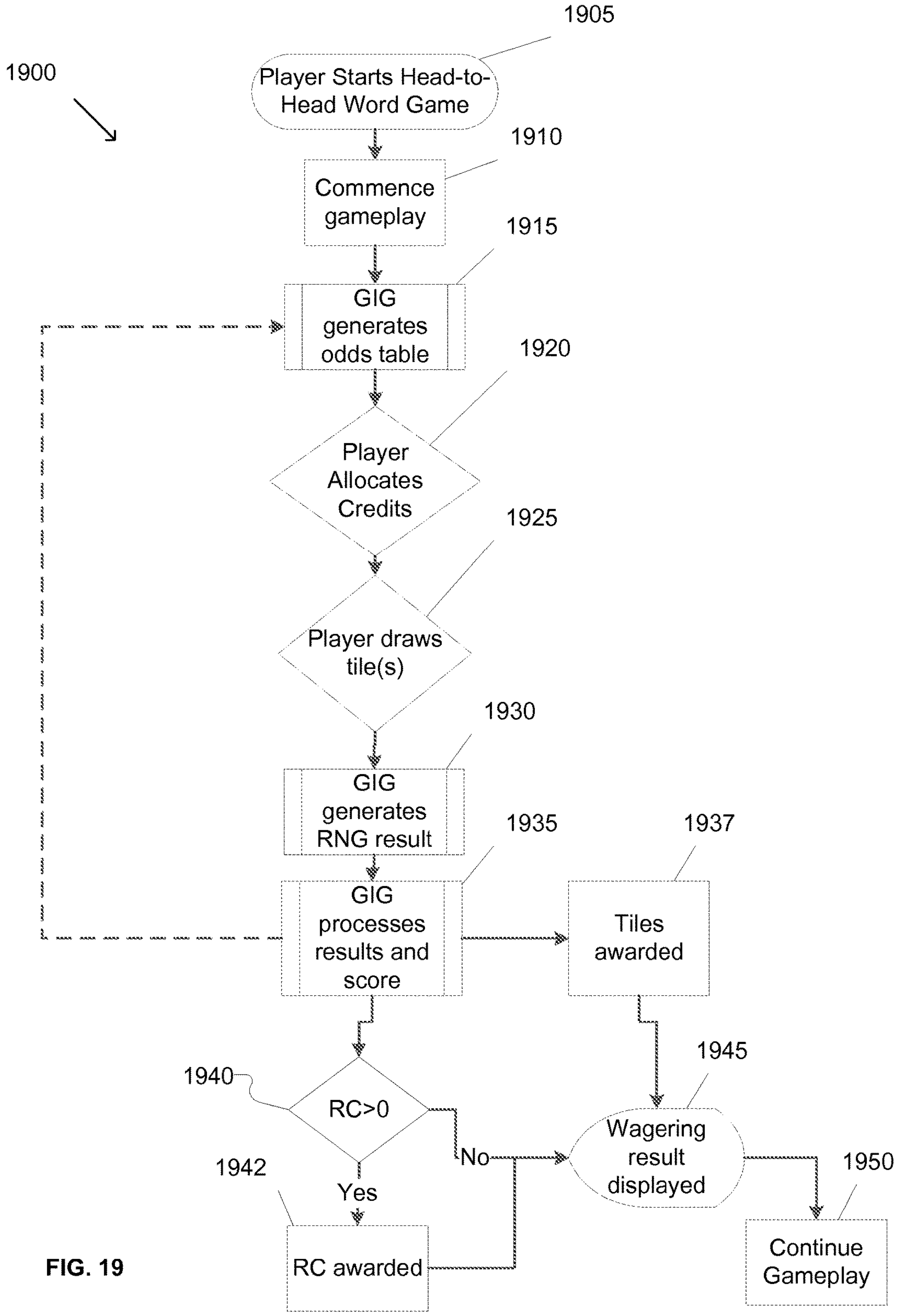
FIG. 19 illustrates a flow diagram of a gambling hybrid game with a gambling integrated game that provides a letter tile game as the entertainment game in accordance with another embodiment of the invention.

Another example of a gambling hybrid game with a GIG in accordance with embodiments of this invention provides a word game as an entertainment game. In a word game, a player randomly selects tiles of letters from a pool of tiles and attempts to place words on a game board using the selected tiles. An example of a word game is Scrabble®. The GIG drives gambling events based upon the random nature receiving tiles from the pool. At the time the tiles are selected, the odds associated with pulling any specific combination of letters from the pool are known. As such, gambling propositions can be offered to the player each time that she selects tiles from the pool as part of the overarching game play. As with any GIG game, the player can be offered a prescribed gambling game, and/or have the option to choose from one or more gambling games in accordance with embodiments of the invention. A process for providing gambling hybrid game with a GIG game based upon a word game in accordance with embodiments of the invention is shown in FIG. 19.

In process 1900, the player initiates the gambling hybrid game with a word game as the entertainment game (1905). Game play of the word game commences (1910). At the beginning of a player's turn, the GIG generates odds tables for pulling a specific combination of letters (1915). The player then allocates wagers to a bet on one or more of the specific combinations of letters. The player then receives the tiles with letters from the pool of tile (1925) based upon the results of RNG provided by the GIG (1930). The GIG then processes the results of the tiles received (1937) by the player and resolves any wagers and/or awards based upon the tiles received (1940). Depending on the results, the process may be repeated to provide other wagers and/or random events. The results of the wager (1940) and any RC won based wagers (1942) are then displayed to the player (1945) and game play continues (1950).

Although a specific process for providing a gambling hybrid game with a GIG providing a word game as the entertainment game is discussed above with respect to FIG. 19, any of a variety of processes for providing a gambling hybrid game with a GIG can be utilized as appropriate to the requirements of specific applications in accordance with embodiments of this invention.

For example, a player turn may occur as follows. A player receives three tiles from the pool to replace tiles used to form a word on the game board. To obtain the tiles, player commits three RC to one or more gambling games based upon previous decisions by the player in the context of casino provided choices. The GIG offers the player a high volatility, a mild volatility and a low volatility proposition as follows: a high volatility proposition is "Draw A-A-A and win 2000 credits per credit bet"; a medium volatility proposition is "Draw two vowels and win 2 credits per credit bet"; and a low volatility proposition is "Draw three consonants and win 10 credits per credit bet".

The player can allocate the three credits in any of the following manners: one of the three credits to each of the above propositions; two credits to one proposition and the third credit to a second proposition; or all three credits to a single proposition. In accordance with a number of embodiments, the game shows the player the odds associated with each available bet. In accordance with many embodiments, the player may not be provided choices. Instead, the player is provided a pre-structured table of potential outcomes such as the following table. In accordance with some embodiments, the percentage odds can be constructed given the number of tiles that need to be drawn, and the tiles remaining in the bag with blank tiles considered as wild cards. The player may or may not be shown the column "Percentage Odds of Drawing this Tile Set" depending on the embodiment.

| Tiles Pulled (order is significant) | Percentage Odds of Drawing this Tile Set | Payout on 3 committed credits |
|---|---|---|
| A-A-A | 0.1% | 250 |
| Two vowels and one consonant | 36% | 3 |
| Three consonants | 12% | 4 |
| Three vowels | 12% | 4 |
| C-O-W | 0.005% | 3,000 |
| D-O-G | 0.003% | 10,000 |
| Three vowels | 12% | 4 |
| All others | 17% | 0 |

One skilled in the art will recognize that the above percentages are for illustrative purposes only and the exact percentages can change as game play proceeds. During each turn, the player will see a new set of payout possibilities immediately before drawing tiles from the bag. In accordance with some embodiments, display of the table may be initiated by the player using a button; an on-screen control; and/or some other mechanism. In general, the GIG can structure the payouts and select the winning options to provide the same overarching expected payout per gambling game in accordance with many embodiments. In a number of embodiments, the volatility can vary from the onset of the game towards the end of the game. During game play of certain games, such as "Words With Friends", the number of tiles in the bag diminishes as the game progresses causing the range of outcomes to narrow. As a result, it may not be possible to provide an equivalent distribution of outcomes or volatility as when the game commenced.

In accordance with some embodiments of a gambling hybrid game with a GIG and providing a word game as the entertainment game, or any GIG, it is also possible to offer gambling propositions that span multiple turns of the same player or multiple turns inclusive of more than one player. Because of the dependencies across player turns, and the fact that it is unknown how many tiles will be drawn in subsequent turns, this specific aspect may not be applicable in Words with Friends. Flowever, spanning gambling propositions across multiple turns may be practical in other entertainment games where the explicit random elements are consistent from turn to turn. For example, in the game of LIFE®, the player spins the same spinner each turn, generating a random number between 1 and 10.

Other Features of a Gambling Hybrid Game with a GIG

In accordance with some embodiments, tournament entry for play of gambling hybrid games with a GIG can be governed by overall GWC won, such that GIG games can each have a schema for awarding points for a player's in-game performance. Tournament entry can also be governed by a player's skill rating such that bands of skill can be established and players are given access to enter tournaments as a function of their demonstrated skill in accordance with a number of embodiments. Other requirements, such as number of games played, funds committed to games, a player's status vis-a-vis a casino's player's club, etc. can all impact eligibility to enter a tournament where the tournaments being be either for playing GIG game, or for playing the underlying entertainment game without the GIG component. Skill ratings can be established using a number of systems, including ELO or modified ELO systems that account for the gambling outcomes experienced by the player to various extents.

In accordance with some embodiments, head-to-head betting is also available in a gambling hybrid game with a GIG game. Odds can be set as a function of a player's skill rating, experience, or other factors. In accordance with a number of embodiments, players can set their own bet structures as a function of their knowledge about one another, and/or the subject of the bet (i.e. outright win vs. a specific in-game achievement, etc.).

Provision of a Gambling Hybrid Game with a GIG

Figure 20:
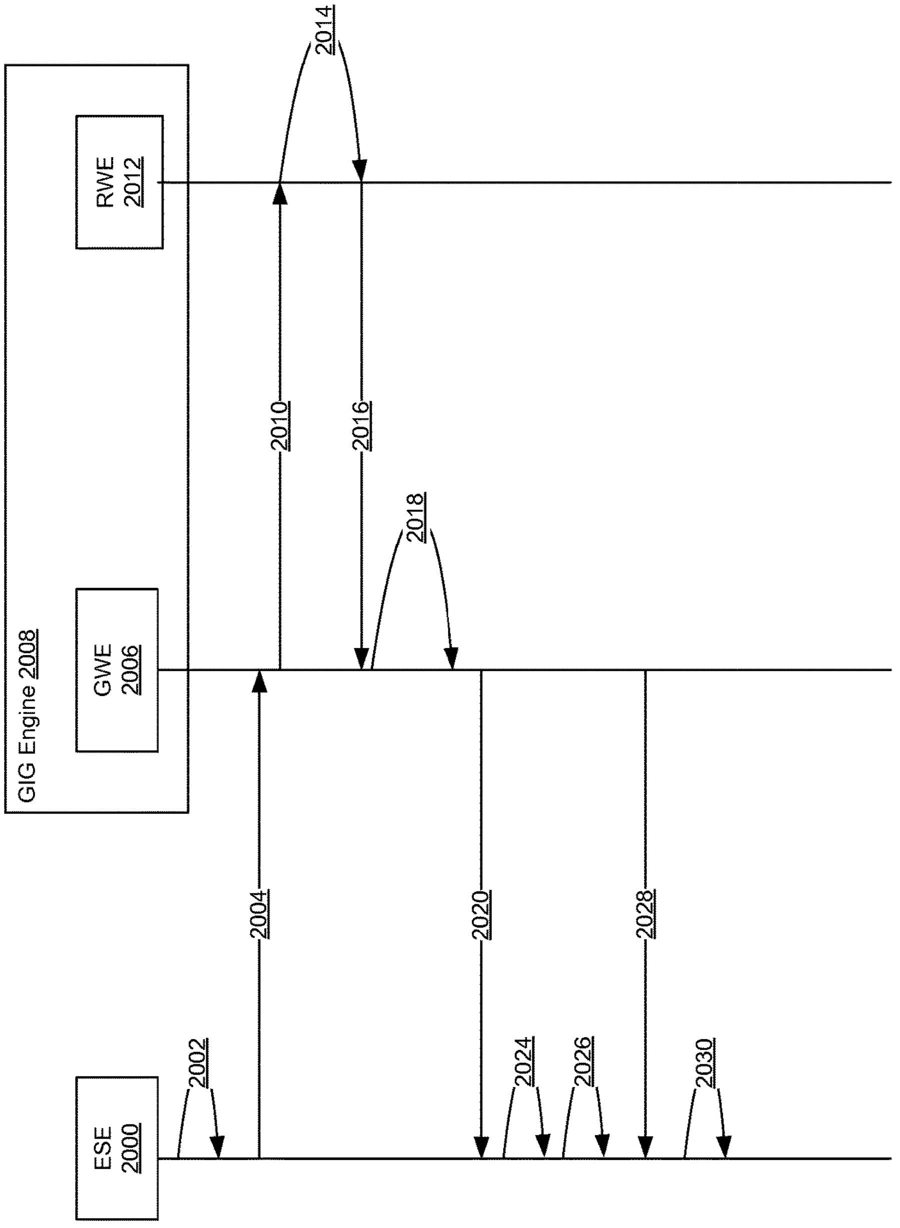
FIG. 20 illustrates a timing chart showing components of a gambling hybrid game providing a gambling integrated game in accordance with an embodiment of the invention.

In accordance with several embodiments of this invention, the ESE, GWE, and RWE of a gambling hybrid game provides a GIG. A timing chart showing the processes performed by the ESE, GWE, and RWE and the communications between these components to provide a GIG in accordance with an embodiment of this invention is illustrated in FIG. 20. The ESE 2000 provides an entertainment game in which random events are utilized to implement the game rules of an entertainment game. During the play of the entertainment game 2002, game events 2004 are communicated by the ESE to a GWE 2006 that is included in a GIG engine 2008. The GWE receives the game events and determines an occurrence of one or more random events within the entertainment game of the ESE and that a resolution to the one or more random events is needed by the ESE for the entertainment game. In addition, the GWE determines if the game events indicate an occurrence of one or more gambling events and that a wager or wagers should be initiated in accordance with a gambling proposition of a gambling game. The GWE communicates a request 2010 to an RWE 2012 for random outcome information. The RWE receives the request and determines 2014 random outcome information 2016. The random outcome information includes a sequence of one or more random outcomes that can be used to resolve the one or more random events in the entertainment game. In addition, the sequence of one or more random outcomes can also be used to determine a resolution to the one or more gambling events. In some embodiments, the random outcome information also includes a complete resolution of one or more gambling events, such as payouts or the like computed using a pay table that is a result of a wager in accordance with the gambling proposition involving real or virtual credits. The random outcome information is communicated by the RWE to the GWE. The GWE uses the random outcome information to resolve 2018 the occurrence of the one or random events for the ESE. The GWE then communicates the resolution 2020 to the ESE. The ESE receives the resolution from the GWE and integrates 2024 the resolution within the entertainment game. The resolution of the one or more random events and/or the integration of the resolution to the one or more random events is also displayed 2026 to the player. The GWE communicates to the ESE the resolution of the occurrence of the one or more gambling events 2028. The ESE receives the resolution of the occurrence of the one or more gambling events and displays 2030 the resolution of the occurrence of the one or more gambling events to the player within the context of the entertainment game.

In some embodiments, the GWE does not resolve the one or more random events for the ESE. Instead, the GWE communicates the random outcome information directly to the ESE and the ESE generates the resolution to the one or more random events.

In some embodiments, the GWE determines random outcome information for the resolution of the occurrence of the one or more random events while the RWE determines random outcome information for the resolution of the occurrence of the one or more gambling events.

In some embodiments, an accumulation of a sequence of random outcomes is used to resolve an occurrence of a gambling event while intermediate random outcomes of the sequence of random outcomes are used to resolve occurrences of one or more random events in the entertainment game. In many of these embodiments, the RWE caches the intermediate random outcomes of the sequence of random outcomes until the sequence of random outcomes is complete enough that the sequence of random outcomes can be utilized to resolve the occurrence of the gambling event by generating a gambling outcome. In some embodiments, the GWE caches the intermediate random outcomes of the sequence of random outcomes until the sequence of random outcomes is complete enough that the sequence of random outcomes can be utilized to resolve the occurrence of the gambling event and determine a gambling outcome. In many embodiments, the GWE requests an entire sequence of random outcomes sufficient to resolve an occurrence of a gambling event, and then determines resolutions of occurrences of one or more random events in the entertainment game as the random events occur in the entertainment game. Once enough random events have occurred corresponding to the random outcomes that were used to determine the resolution to the gambling event, the resolution of the occurrence of the gambling event is communicated to the ESE for display to the player.

In some embodiments, the sequence of one or more random outcomes are used to resolve a sequence of random events in an entertainment game. In many embodiments, the entertainment game is an electronic strategy-based game, wherein the sequence of one or more random outcomes simulate throws of dice that are associated with a player's action or a move in the electronic strategy-based game. The results of each throw of the dice are communicated to the ESE for utilization in accordance with the rules of the entertainment game to advance play of the entertainment game. In addition, a sequence of two or more throws of the dice are used to resolve a gambling outcome. In various embodiments, the sequence of one or more random outcomes simulates a series of die or dice throws or spinner spins that are used to resolve a sequence of random events in an electronic board game, wherein each die throw or spinner spin is associated with a movement along a path of the electronic board game. The results of each die or dice throw are communicated to the ESE for use in the entertainment game so that a player may advance through the game. In addition, a sequence of two or more die or dice throws or spinner spins are used to resolve a gambling outcome. In several embodiments, the sequence of one or more random outcomes simulate a series of random tile draws used to resolve a sequence of random events in an electronic word game. The results of each tile draw are communicated to the ESE for use in the entertainment game so that a player may play the electronic word game. In addition, the sequence of two or more tile draws are used to resolve a gambling outcome.

FIGS. 21A to 21E illustrate a display of a user interface of a GIG in accordance with embodiments of the invention. In the figures, elements having the same element identifiers refer to either the same element or elements having the same functions. The entertainment game displayed is an electronic strategy game in which players compete against each other or a computer to take and hold regions of a game board through simulated military-themed battles simulated using die throws. As illustrated, the display 2100 includes an entertainment game portion (including a stylized world map) and a gambling outcome display portion 2200.

The gambling outcome display portion 2200 is operational to display information about the gambling proposition of the hybrid game. The gambling outcome display portion 2200 of the display includes, but is not limited to, a display of a denomination of the game 2202, a display of an amount of real credits 2204 attributed to the player, and an amount of real credits 2206 about to be wagered.

The world map is divided into a plurality of world regions, such as regions 2102 and 2104, corresponding roughly with continents, sub-continents and/or large countries. A player may place one or more game world resources representing "armies" or "troops", such as game resources 2106 and 2108, in each region controlled by a player. A player may "attack" another adjacent region from a particular region using the one or more game world resources in that particular region. To do so, the player selects one of their regions (for example, as illustrated, the player has selected region 2102 having game world resources 2106) and then selects another adjacent region to attack (for example, as illustrated, region 2104 having game world resources 2108). Upon selection, the game world resources for each selected region are displayed (for example, as illustrated "Your Armies" 2120 and "Enemy Armies" 2122.) In addition, an amount of credits 2124 that the attacking player is about to wager is displayed. An "odds" button 2126 is selectable to display to a player the odds and/or pay tables associated with the player's proposed move. An "attack" button 2128 is operable to perform the proposed move or action.

Figure 21A:
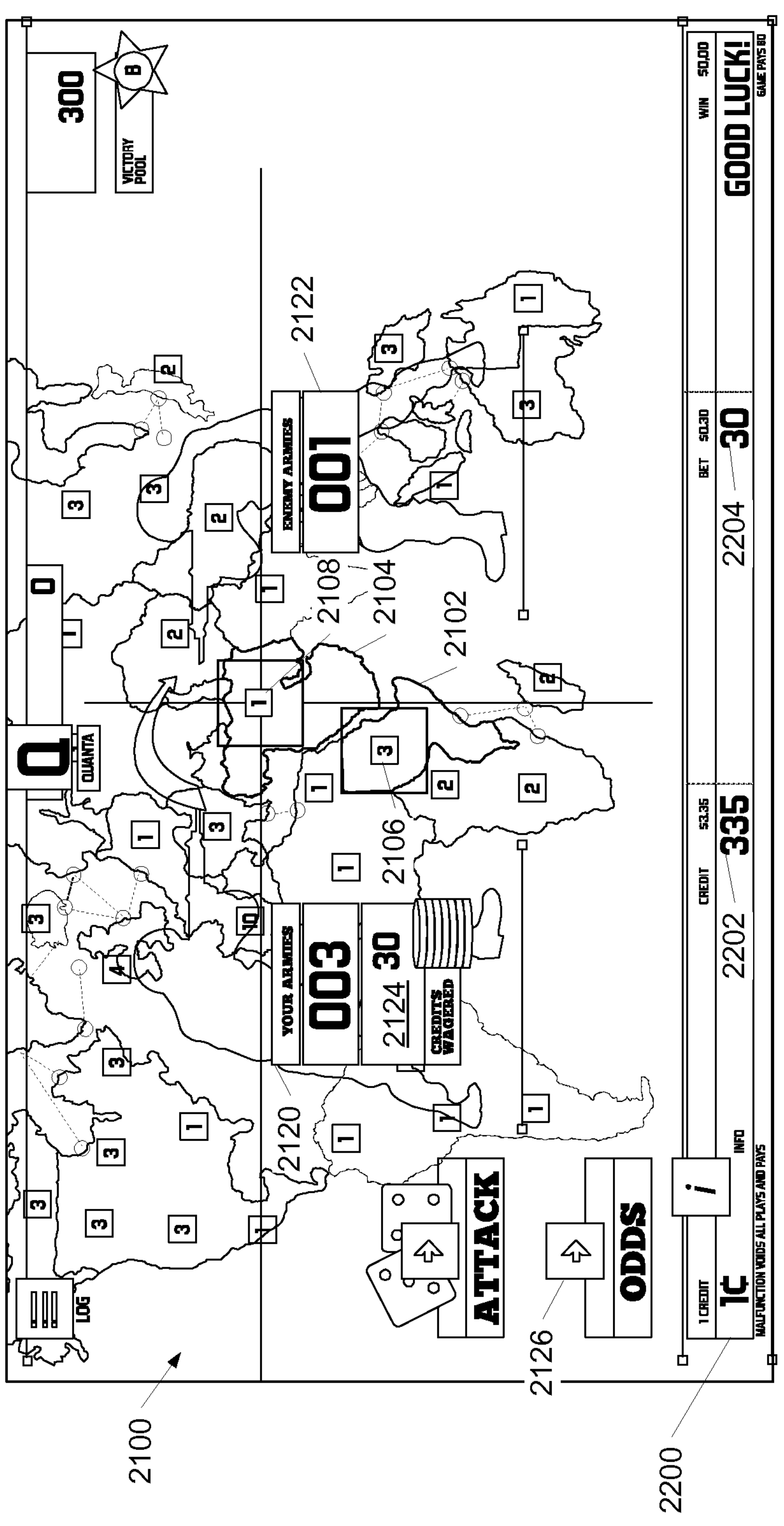
FIGS. 21A to 21H illustrate a display of a gambling hybrid with a gambling integrated game in accordance with embodiments of the invention.
Figure 21B:
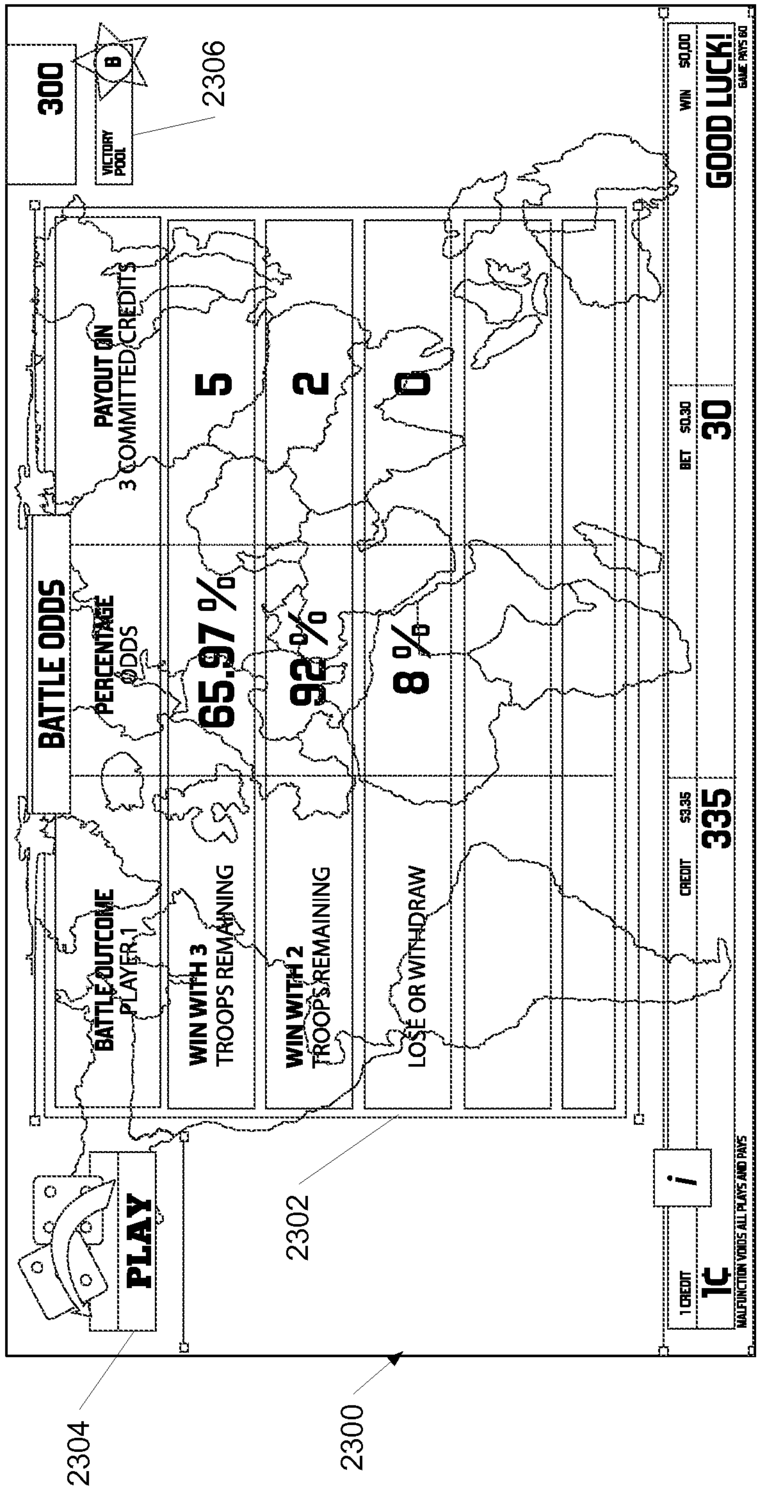

Referring now to FIG. 21B, an odds and pay table display for a proposed move by a player is illustrated in accordance with embodiments of the invention. The display 2300 includes a table 2302 including a plurality of columns. In a first column, possible battle outcomes are displayed. In a second column, a probability that a particular battle outcome will occur is shown. In a third column, a payout for a specified number of credits is shown. The odds and pay table display includes a "play" button 2304 selectable to cause the proposed battle to take place. In some embodiments, an amount of a credit pool 2306 available to a player on achieving a particular goal in the entertainment game is displayed.

In some embodiments, the number of real world credits committed to a proposed action or move is equal to, or is a function of, the number of entertainment game resources the player is willing to commit to the proposed action or move. Accordingly, the odds table is generated based on the game state of the entertainment game being played as well as a pay table for a gambling proposition. The game state of the entertainment game may include, but is not limited to, an amount of game world resources available to the player, a position or location within a game world of the entertainment game, an amount of game world resources that a player may be proposing to commit to a move or operation, etc.

Figure 21C:
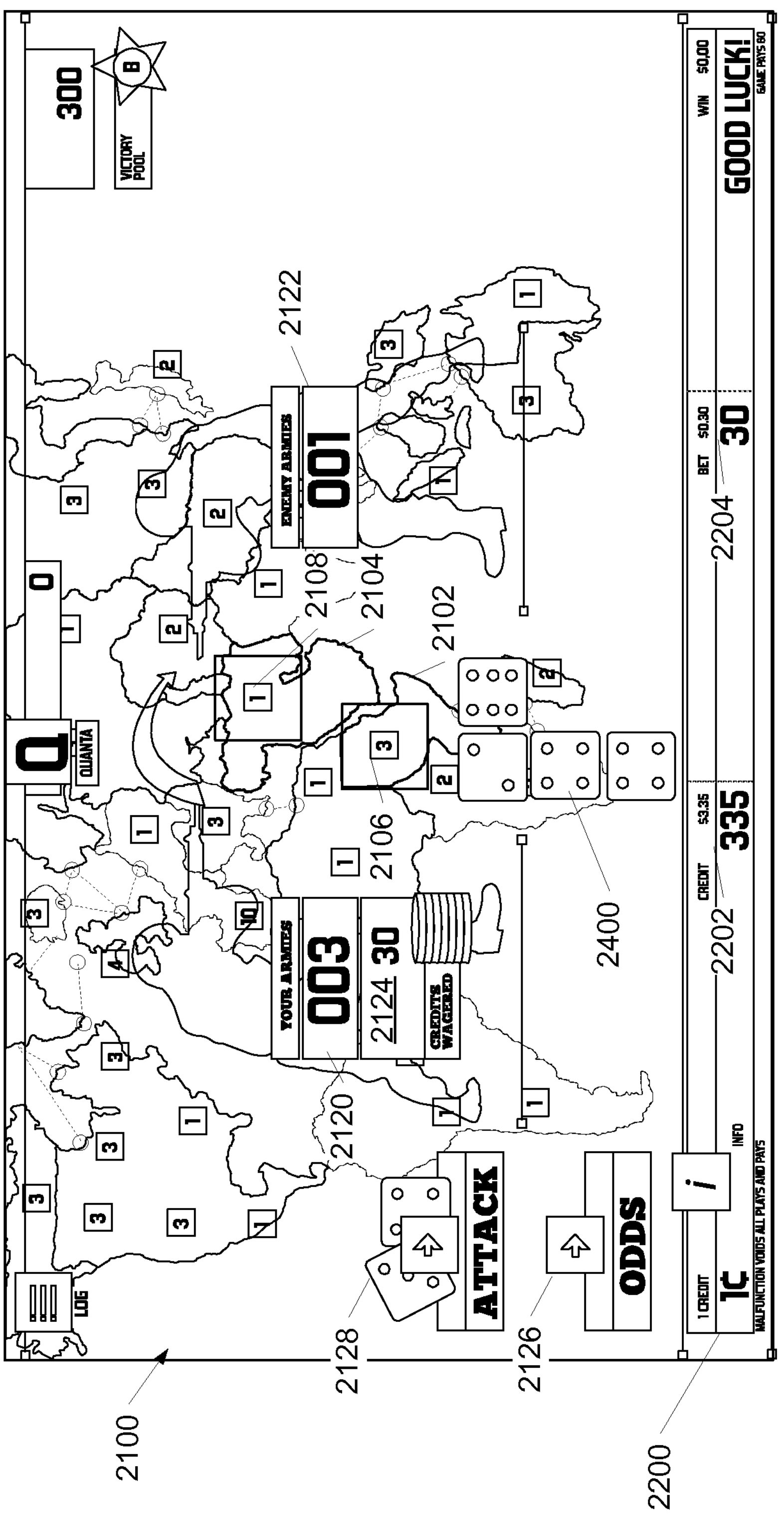

Referring now to FIG. 21C, an operation of the display 2100 during a player move or action is illustrated in accordance with embodiments of the invention. As illustrated, the "attack" button 2128 has been selected in order to initiate the player's move or action. Selection of the attack button by the player indicates an occurrence of a random event in the entertainment game. Selection of the attack button may also indicate an occurrence of a gambling event. In the display, an outcome 2400 of a result of a random event in the entertainment game is displayed. In this embodiment, a result of a simulated dice throw is illustrated although other types of representations of the outcome of the random result may be utilized as appropriate for the underlying entertainment game.

Continuing the exemplary embodiment, three dice are shown as having been thrown for the player, as that is the number of entertainment game resources that the player has committed to the proposed move or action, whereas the player's opponent has only thrown a single die, representing the number of entertainment game resources that the opponent has available to oppose the player's move or action. The results of the dice throw are one possible random outcome resolution of the random event in the entertainment game; however, additional random outcomes of a sequence of random outcomes are to be determined before the gambling event can be resolved. In the simulated throw, the player rolled a two, a four and a four, whereas the player's opponent has thrown a single six. As none of the player's dice have a thrown value greater than the opponent's single thrown value of six, the player will lose one entertainment game resource. Also, as the player's move is not yet complete (as the player has not either completed the proposed move or action nor has the player withdrawn from the move or action) a gambling outcome of the wager has yet to be resolved.

Figure 21D:
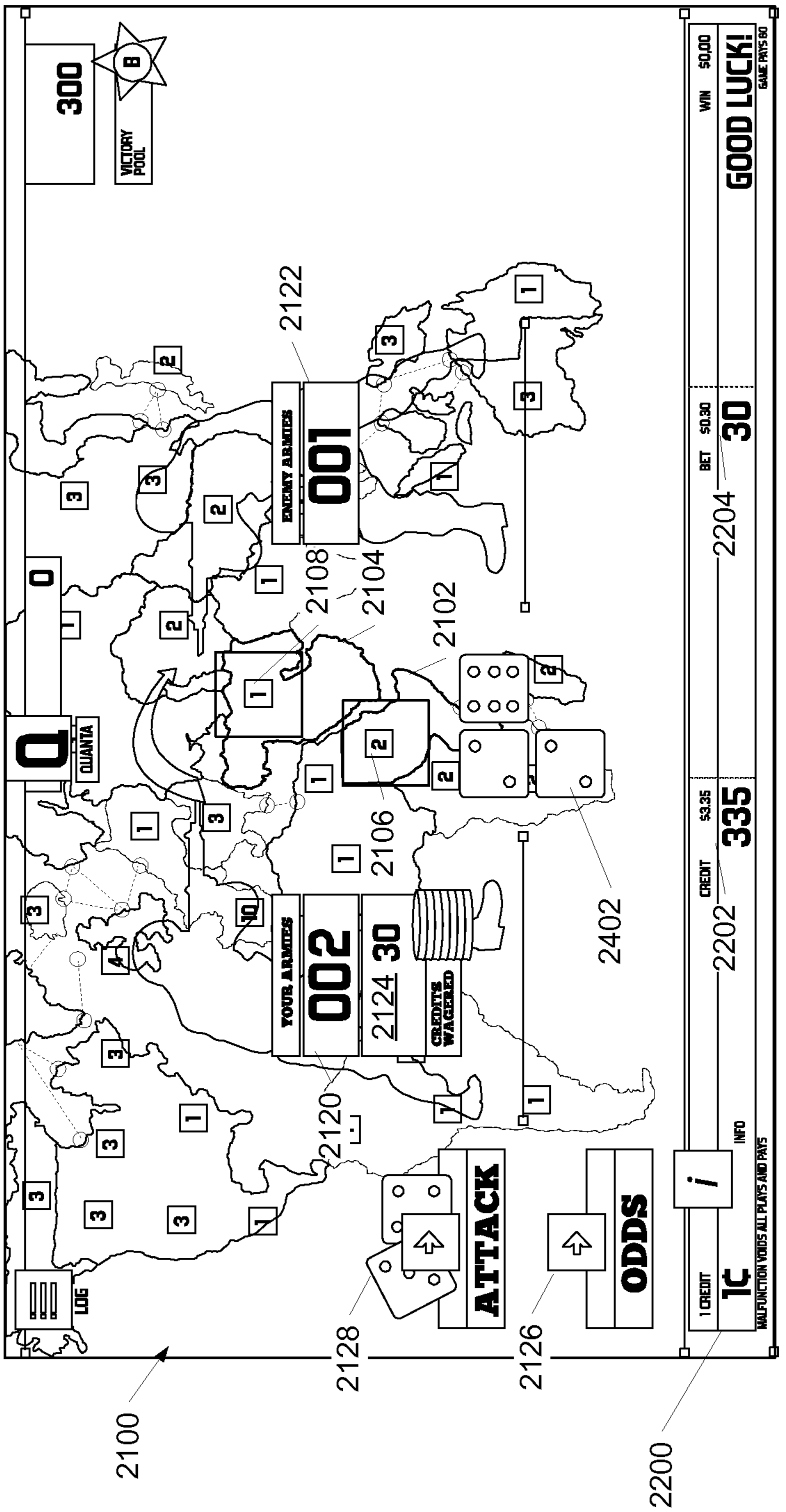

Referring now to FIG. 21D, the player has lost an entertainment game resource as reflected by the numeral "2" being displayed 2106. In addition, the loss of resources is reflected in the entertainment game resource display 2120. As the gambling event has yet to be resolved, the wagered amount 2124 remains the same. In addition, the amount of credits 2202 attributed to the player has not been updated.

Continuing the description of the exemplary embodiment, in the display, a random outcome 2402 of a resolution of a random event is displayed. Two dice are shown as having been thrown for the player, as that is the number of entertainment game resources that the player has committed to the proposed move or action, whereas the player's opponent has only thrown a single die, representing the number of entertainment game resources that the opponent has available to oppose the player's move or action. In the simulated throw, the player rolled two twos, whereas the player's opponent has thrown a single six. As none of the player's dice have a thrown value greater than the opponent's single thrown value of six, the player will lose one entertainment game resource. Also, as the player's move is not yet complete (as the player has not either completed the proposed move or action nor has the player withdrawn from the move or action) a gambling outcome of the wager has yet to be resolved as the sequence of random outcomes is not yet complete.

Figure 21E:
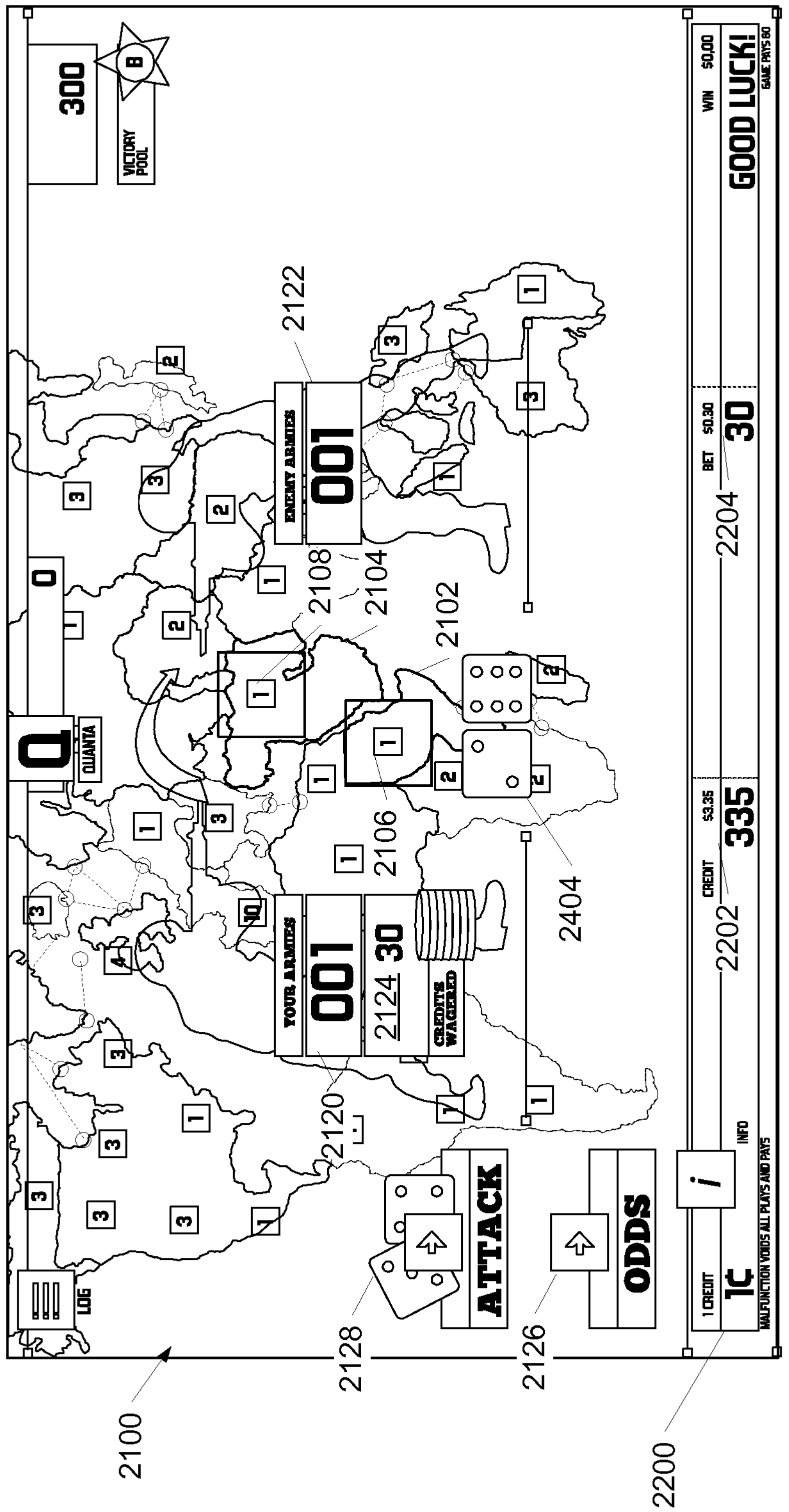

Referring now to FIG. 21E, the player has lost an entertainment game resource as reflected by the numeral "1" being displayed 2106. In addition, the loss of resources is reflected in the entertainment game resource display 2120. As the gambling event has yet to be resolved, the wagered amount 2124 remains the same. In addition, the amount of credits 2202 attributed to the player has not been updated.

Continuing the description of the operation of the exemplary embodiment, in the display, a random outcome 2404 of a result of a random event is displayed. One die is shown as having been thrown for the player, as that is the number of entertainment game resources that the player has committed to the proposed move or action, whereas the player's opponent has also thrown a single die, representing the number of entertainment game resources that the opponent has available to oppose the player's move or action. In the simulated throw, the player rolled a two, whereas the player's opponent has thrown a single six. As the player's die has thrown a value less than the opponent's thrown value of six, the player will lose one entertainment game resource. The sequence of random events is now complete, and the gambling event can now be resolved.

Figure 21F:
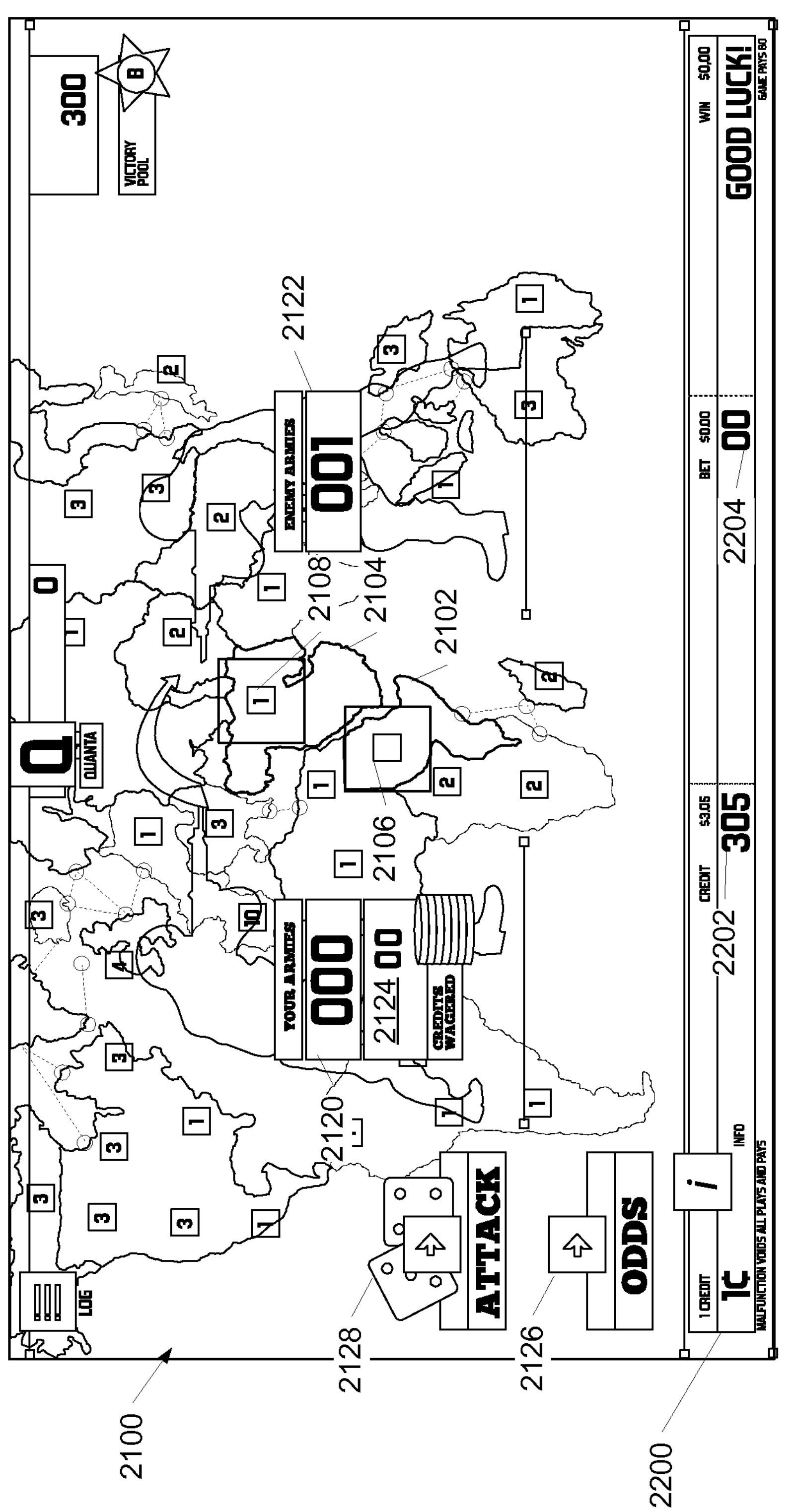

Referring now to FIG. 21F, the player has lost an entertainment game resource as reflected by no entertainment game resources being displayed 2106. In addition, the loss of resources is reflected in the entertainment game resource display 2120. As the sequence of random outcomes represented by simulated dice throws is now complete, the gambling event can now be resolved using the sequence of random outcomes. In this example, the gambling outcome is a loss to the player, and the wagered amount 2124 and 2204 are zeroed out. In addition, the amount of credits 2202 attributed to the player has been updated to reflect the loss.

Figure 21G:
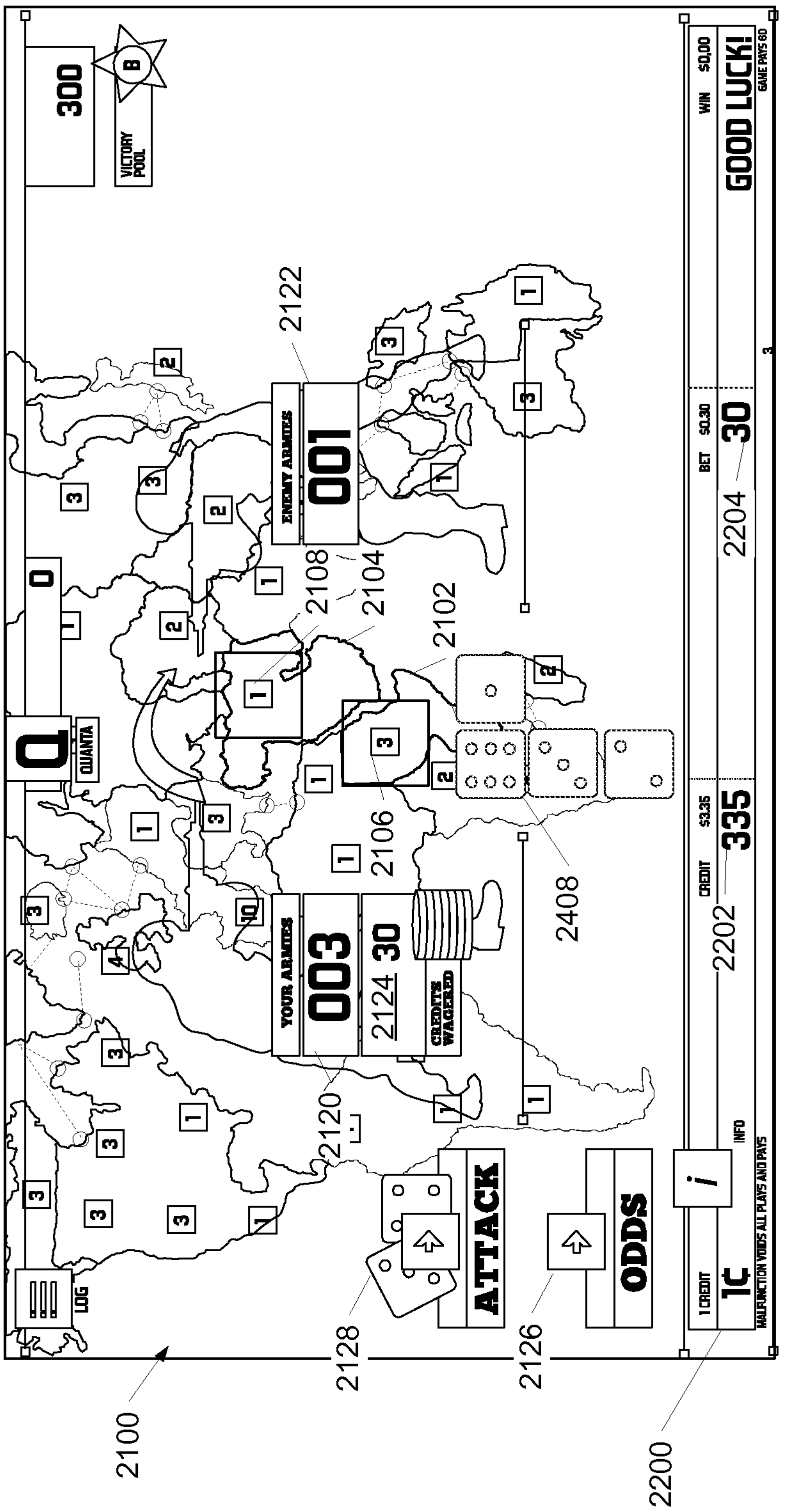

Referring now to FIG. 21G, an operation of the display 2100 during a player move or action as the player is winning a wager with a winning gambling outcome is illustrated in accordance with embodiments of the invention. As illustrated, the "attack" button 2128 has been selected in order to initiate the player's move or action. In the display, a random outcome 2408 of a result of a random event is displayed. In this embodiment, a result of a simulated dice throw is illustrated although other types of representations of the outcome of the random result may be utilized as appropriate for the underlying entertainment game.

Continuing the description of the operation of the exemplary embodiment, three dice are shown as having been thrown for the player, as that is the number of entertainment game resources that the player has committed to the proposed move or action, whereas the player's opponent has only thrown a single die, representing the number of entertainment game resources that the opponent has available to oppose the player's move or action. In the simulated throw, the player rolled a six, a three and a two, whereas the player's opponent has thrown a single one. As at least one of the player's dice has a thrown value greater than the opponent's single thrown value of one, the player has completed the proposed move or action by "winning" the "battle." In addition, as the player's move or action is complete, a sequence of random outcomes is also complete and the player's gambling outcome can also be determined as a resolution to the gambling event. In this case, the player has a successful or winning gambling outcome.

Figure 21H:
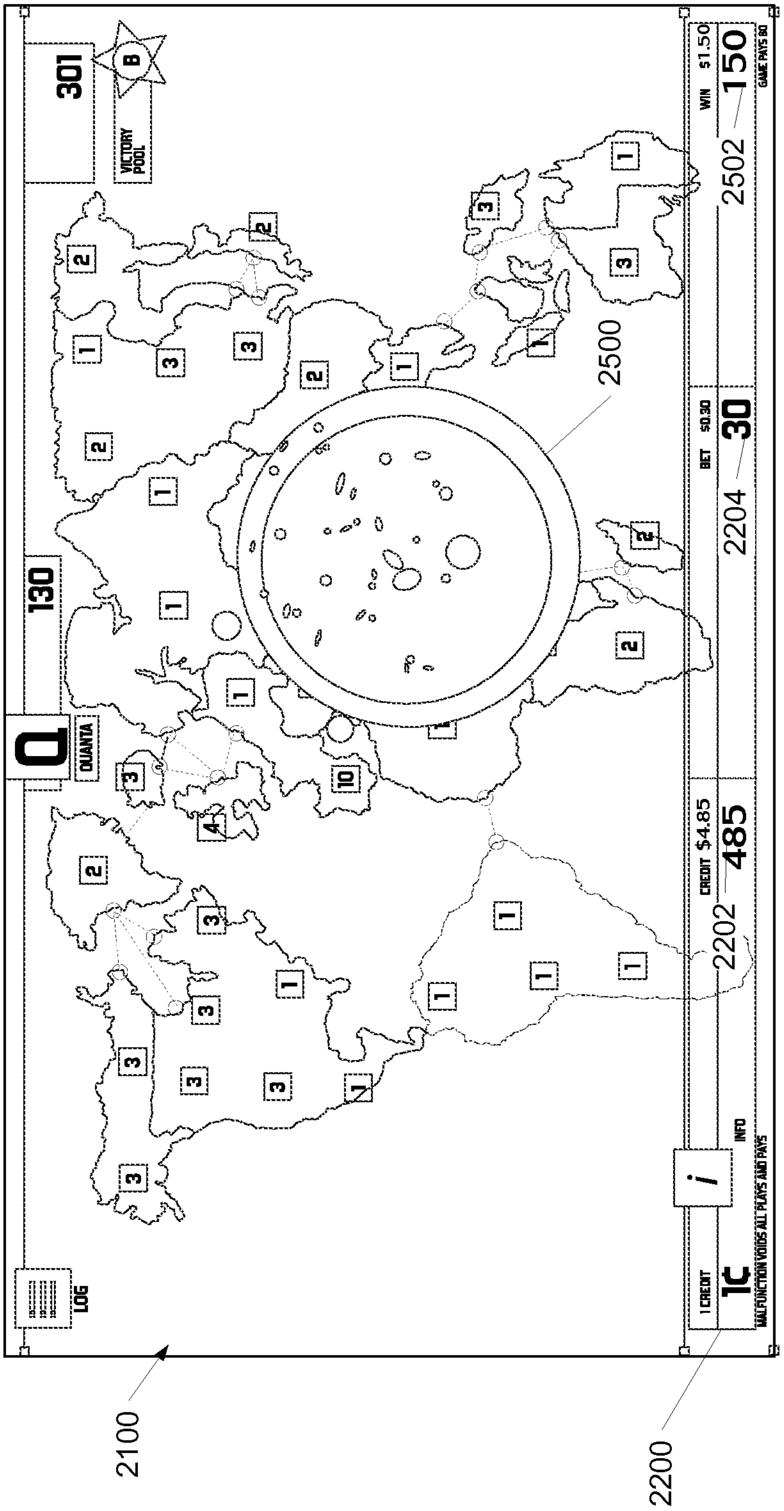

Referring now to FIG. 21H, the player has had a successful gambling outcome and a success display is generated 2500 within the context of the entertainment game. In addition, the amount of credits attributed to the player 2202 has been updated as well as a display of credits won 2502.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that a hybrid gaming system may be practiced otherwise than as specifically described. Thus, the foregoing description of the hybrid gaming system should be considered in all respects as illustrative and not restrictive, the scope of the claims to be determined as supported by this disclosure and the claims' equivalents, rather than the foregoing description.

What is claimed is:

1. A casino electronic game machine providing a gambling hybrid game that includes an entertainment game and a gambling game, comprising:

a real world engine comprising:

a real world credit meter;

a random number generator; and a real world credit pay table, wherein the real world engine is configured to:

receive real world credit from a portable media, wherein the portable media includes at least one member of a group including currency, a voucher and a smart card; and generate a gambling event resolution using the random number generator;

generate a randomly generated payout of real world credits from a wager of real world credits in the gambling game using the gambling event resolution and real world credit pay table;

distribute the gambling event resolution to the game world engine;

augment an amount of real world credits stored in the real world credit meter based on the randomly generated payout of real world credits to the real world credit meter;

an entertainment system engine constructed to:

execute the entertainment game to resolve a random event in the entertainment game to generate random event results;

generate a visual display of the entertainment game on a display screen;

provide the random event results to a game world engine;

generate a visual display of the random event results on the display screen; and a user input device configured to receive from a player a wagering amount to use during game play; and the game world engine constructed to:

determine an occurrence of a gambling event in the gambling game based on play of the entertainment game executed by the entertainment system engine;

request a resolution to the gambling event by the real world engine;

determine gambling results based upon the random event results and the gambling event resolution; and distribute the gambling results to the entertainment system engine for use in executing the entertainment game.

2. The casino electronic game machine of claim 1, wherein the real world engine is further configured to:

receive, from the game world engine, the random event results;

determine the gambling results based in part from random event results; and provide, to the game world engine, the gambling results.

3. The casino electronic game machine of claim 1, wherein entertainment system engine is further constructed to:

detect the random event is to occur during execution of the entertainment game;

request, from the game world engine, gambling information for the random event;

receive, from the game world engine, the gambling information for the random event; and provide the gambling information to the player during execution of the entertainment game.

4. The casino electronic game machine of claim 3, wherein the game world engine is further constructed to:

generate the gambling information for the random event.

5. The casino electronic game machine of claim 4, wherein the game world engine is further constructed to:

request, from the real world engine, the gambling information for the random event; and receive, from the real world engine, the gambling information for the random event.

6. The casino electronic game machine of claim 5, wherein the real world engine is further constructed to:

determine the gambling information for the random event; and provide, to the game world engine, the gambling information for the random event.

7. The casino electronic game machine of claim 1, wherein the game world engine is further constructed to:

receive player information from a player management system; and use the random event results and the player information to determine the gambling results for the random event.

8. The casino electronic game machine of claim 1, wherein the game world engine is further constructed to:

receive game provider information from a game provider system; and use the random event results and the game provider information to determine the gambling results for the random event.

* * * * *